United States Patent [19]

Usami et al.

[11] Patent Number: 4,994,989

[45] Date of Patent: Feb. 19, 1991

[54] DISPLAYING METHOD AND APPARATUS FOR THREE-DIMENSIONAL COMPUTER GRAPHICS

[75] Inventors: Yoshiaki Usami, Hitachi; Kenichi Anjyo, Hitachiota; Yoshimi Oota, Hitachi, all of Japan

[73] Assignee: Hitachi, Ltd., Tokyo, Japan

[21] Appl. No.: 256,393

[22] Filed: Oct. 7, 1988

[30] Foreign Application Priority Data

Oct. 9, 1987 [JP] Japan .................................. 62-253681

[51] Int. Cl.$^5$ ............................................. G06F 15/66
[52] U.S. Cl. ...................................... 364/522; 340/729
[58] Field of Search ..................... 364/518, 521, 522; 340/729; 382/41

[56] References Cited

U.S. PATENT DOCUMENTS

| | | | |
|---|---|---|---|
| 3,602,702 | 8/1971 | Warnock | 364/522 |
| 4,475,104 | 10/1984 | Shen | 364/521 X |
| 4,665,555 | 5/1987 | Alker et al. | 382/41 |
| 4,719,585 | 1/1988 | Cline et al. | 364/522 X |
| 4,766,556 | 8/1988 | Arakawa | 364/522 |
| 4,775,946 | 10/1988 | Anjyo | 364/522 |
| 4,821,214 | 4/1989 | Sederberg | 364/522 |

FOREIGN PATENT DOCUMENTS 62-241076  10/1987  Japan .

Primary Examiner—Dale M. Shaw
Assistant Examiner—Michael A. Jaffe
Attorney, Agent, or Firm—Kenyon & Kenyon

[57] ABSTRACT

A display apparatus and a modelling method for computer graphics includes a first memory for storing a first three-dimensional model, a detailed model, of a body represented by at least one of desired first number of dimensions, a desired first number of parameters and desired first parametric quantities, an arithmetic unit for arithmetically determining a second three-dimensional model, a simplified model, by varying at least one of the first number of dimensions, the first number of parameters and the first parametric quantities to at least one of a second number of dimensions, a second number of parameters and second parametric quantities in accordance with an algorithm for thereby creating automatically a simplified model for a body of less importance. A second memory stores the simplified model. A selector selects the first three-dimensional model or the second three-dimensional model by reference to a preset index for evaluation. A display unit displays the first three-dimensional model or the second three-dimensional model as selected.

33 Claims, 26 Drawing Sheets

F I G. 9
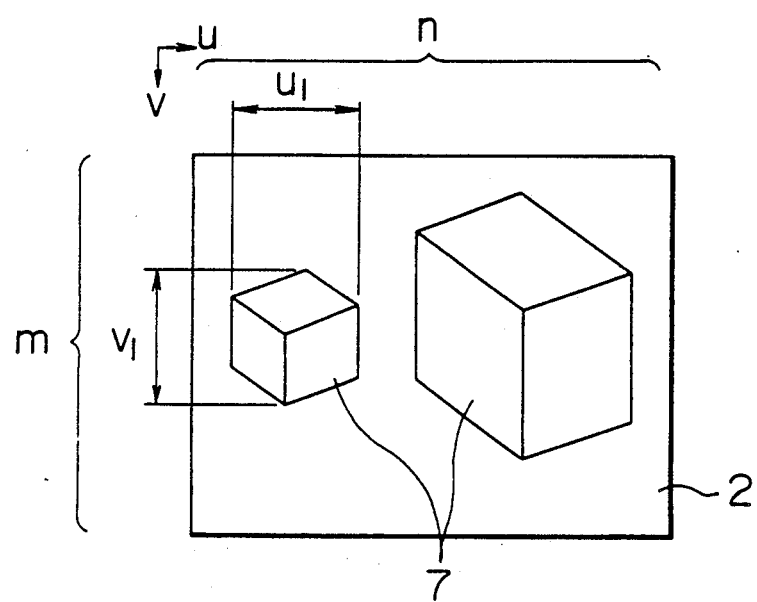

TRANSMITTANCE DATA

REPRESENTATION BY DETAILED MODEL

REPRESENTATION BY SIMPLIFIED MODEL

COLOR DATA

REPRESENTATION BY DETAILED MODEL

REPRESENTATION BY SIMPLIFIED MODEL

NORMAL DATA

BODY SURFACE
TO BE DISPLAYED

NORMAL TO BE
STORED

REPRESENTATION
BY DETAILED MODEL

TRANSMITTANCE DATA

COLOR DATA

NORMAL DATA

REPRESENTATION BY DETAILED MODEL

REPRESENTATION BY SIMPLIFIED MODEL

F I G. 32
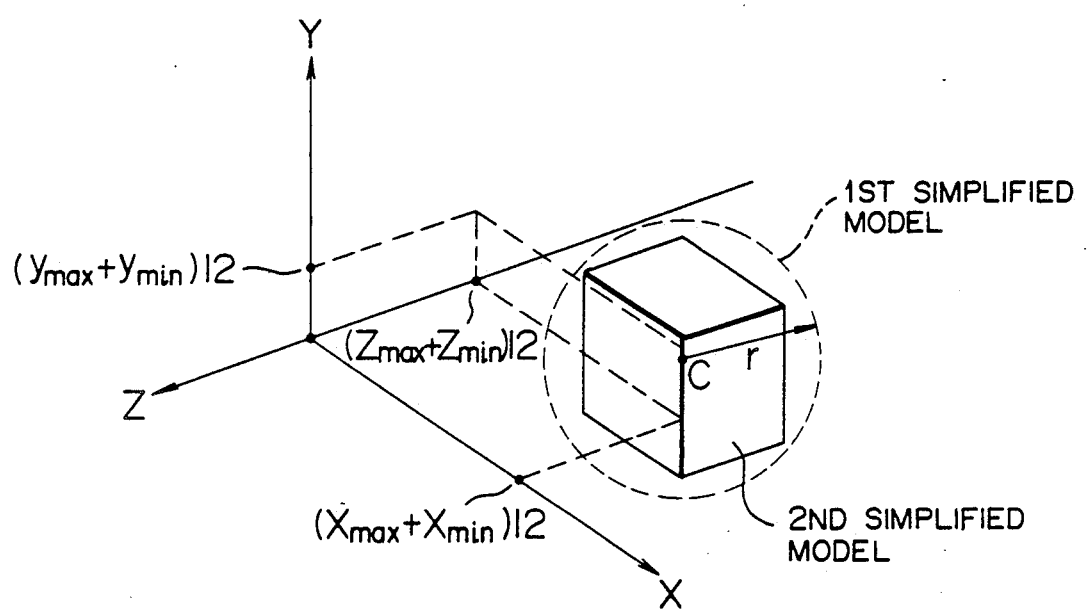

1ST SIMPLIFIED MODEL

2ND SIMPLIFIED MODEL

DETAILED MODEL

2ND SIMPLIFIED MODEL

1ST SIMPLIFIED MODEL

"BODY 1" = "PART 1" U "PART 2" U "PART 3"

"BODY 1" = ("PART 1") U "PART 2" U "PART 3"

"BODY 1" = ("PART 1" U "PART 2") U "PART 3"

"BODY 1" = ("PART 1" U "PART 2" U "PART 3")

DISPLAYING METHOD AND APPARATUS FOR THREE-DIMENSIONAL COMPUTER GRAPHICS

BACKGROUND OF THE INVENTION

The present invention relates generally to modelling and displaying techniques in the graphic processing and more particularly to a displaying method and apparatus suited profitably for three-dimensional computer graphics.

In the field of three-dimensional computer graphics, speeding-up of the processing involved in displaying graphic models of bodies is attempted by taking advantage of the fact that the individual models existing in space occupy only localized regions which are unlikely to overlap one another, as is discussed in "Periodical of the Information Processing Society of Japan", Vol. 25, No. 6 (1984), p. 948. More specifically, there is reported a graphic processing method according to which a delimited space such as, for example, a circumscribing rectangular parallelepiped is defined for a model of a body to be displayed, wherein the processing for searching the model is limited only to the inner space of the circumscribing rectangular parallelepiped. This method is certainly advantageous in that wasteful searching of a region located remotely from the model of concern can be avoided, whereby the processing for generating a graphic representation of the body can be speeded up.

Another method of speeding up the representation processing based on a similar concept is disclosed in Japanese patent application Laid-Open No. 79477/1985 (JP-A-60-79477). According to this known method, searching of a model of a body on a screen is limited to a rectangular region enclosing the model with the aim to enhance the speed of the processing for displaying the same. Further, JP-A-61-139890 discloses a high-speed display processing procedure in which the range to be searched for a model of body to be displayed is also limited in view of the localized disposition thereof while uniformity of the searching process is taken advantage of for speeding up the processing.

On the other hand, in a system disclosed in "Computer Graphics", Vol. 16, No. 3 (1982), pp. 9–18, a plurality of models are allocated to one and the same body to be displayed. More specifically, an operator can prepare a plurality of models having different degrees of detail to be allocated to a same body and input the models in the system which in turn determines discriminatively for the display the model having a desired degree of detail depending on the size of the body on a screen.

Of the prior art techniques described above, the high-speed display procedure based on the utilization of the localized disposition of the model suffers disadvantage in that the search is performed exactly even for a region which is defined for a model located sufficiently far from the visual point and which occupies only an extremely small area of a screen, resulting in the consumption of the time involved in such searching not being reducible by any appreciable degree as compared with the time taken for the searching of a region within which a model located sufficiently near to the visual point is defined. On the other hand, in the system capable of displaying a plurality of models having different degrees of detail, the processing itself can certainly be speeded up for the model located sufficiently remotely from the visual point. However, this system requires preparation and allocation of the models by the operator, increasing the number of interventions to be taken by the operator.

SUMMARY OF THE INVENTION

An object of the present invention is to provide a high-speed display method and apparatus for computer graphics which allows the frequency of interventions by an operator to be significantly decreased and to thereby increase the speed of the processing required for the display.

Another object of the invention is to provide a method according to which a model of a body located sufficiently far from a visual point is simplified in respect to the representation thereof for the purpose of speeding up the processing required for displaying such model and in which a model having a different degree of detail can be arithmetically created in accordance with an algorithm from a model once defined.

In view of the above and other objects which will be more apparent as description proceeds, there is provided according to an aspect of the present invention a display apparatus for computer graphics which comprises a memory for storing a first three-dimensional model of a body represented by at least one of a desired number of dimensions, a desired number of parameters and desired quantities of the parameters, an arithmetic unit for arithmetically creating a second three-dimensional model by varying at least one of the number of dimensions, the number of parameters and the quantities of the parameters mentioned above, and a display unit for displaying the second three-dimensional model.

By virtue of such arrangement that for the first three-dimensional model of a body as inputted, a second three-dimensional model of the body having the number of parameters and/or the number of dimensions varied from those of the first model is arithmetically created, it is possible to display the models having different degrees of detail without increasing the number of steps for inputting the required data.

BRIEF DESCRIPTION OF THE DRAWINGS

FIG. 9 is a schematic diagram showing simplified models in the state projected on the screen.

FIG. 32 is a schematic diagram for illustrating a method of creating a first simplified model by using a circumscribing sphere from a second simplified model created by using a circumscribing rectangular parallelepiped.

DETAILED DESCRIPTION OF THE PRESENT INVENTION

Now, the present invention will be described in detail in conjunction with exemplary embodiments thereof by reference to the drawings.

Figure 1A:
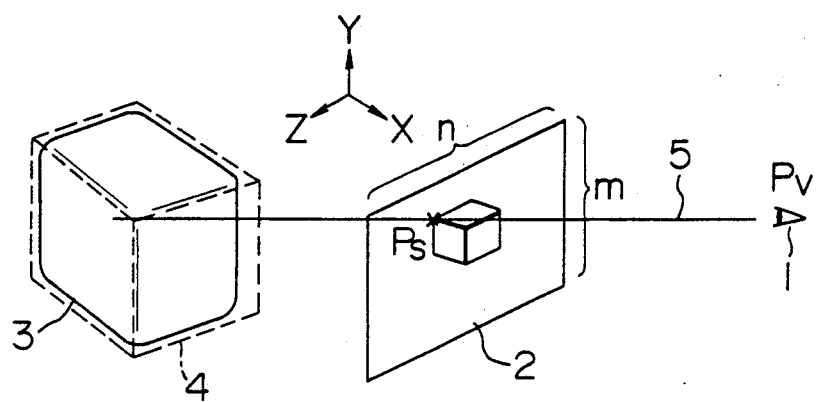
FIGS. 1A to 1D are schematic diagrams illustrating the concept underlying an embodiment of the present invention and an exemplary hardware structure for carrying out the invention.
Figure 1B:
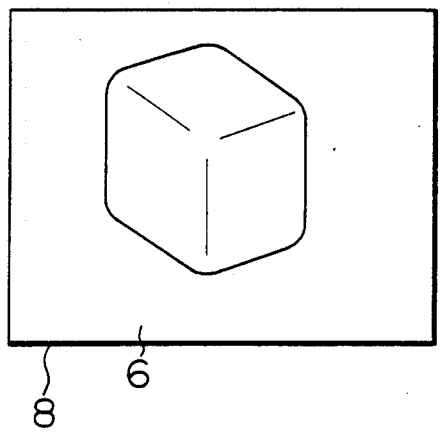
Figure 1C:
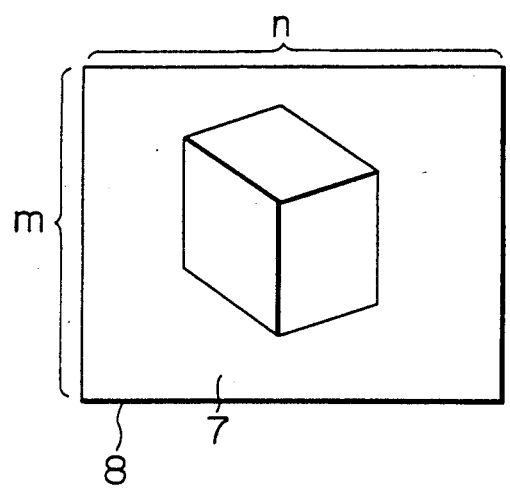

FIGS. 1A to 1D are views for illustrating generally the concept underlying the present invention. More specifically, FIG. 1A illustrates schematically a method of displaying a detailed model 3 representative of a first three-dimensional model of a body and a simplified (abbreviated) model 4 representative of a second three-dimensional model of the body, on a two-dimensional screen, by tracing with a ray of light 5 passing through a screen 2 from a visual point 1 set in three-dimensional space. In this connection, it should however be mentioned that both the detailed model 3 and the simplified or abbreviated model 4 are given in terms of numerical models to a computer system and in actuality a representation 6 (FIG. 1B) by the detailed model 3 as well as a representation 7 (FIG. 1C) by the simplified model 4 is generated in the form of graphic images on the screen 8 of a two-dimensional display unit such as CRT, liquid crystal, EL or the like display unit on the basis of the results of arithmetic operation performed by the computer.

Figure 1D:
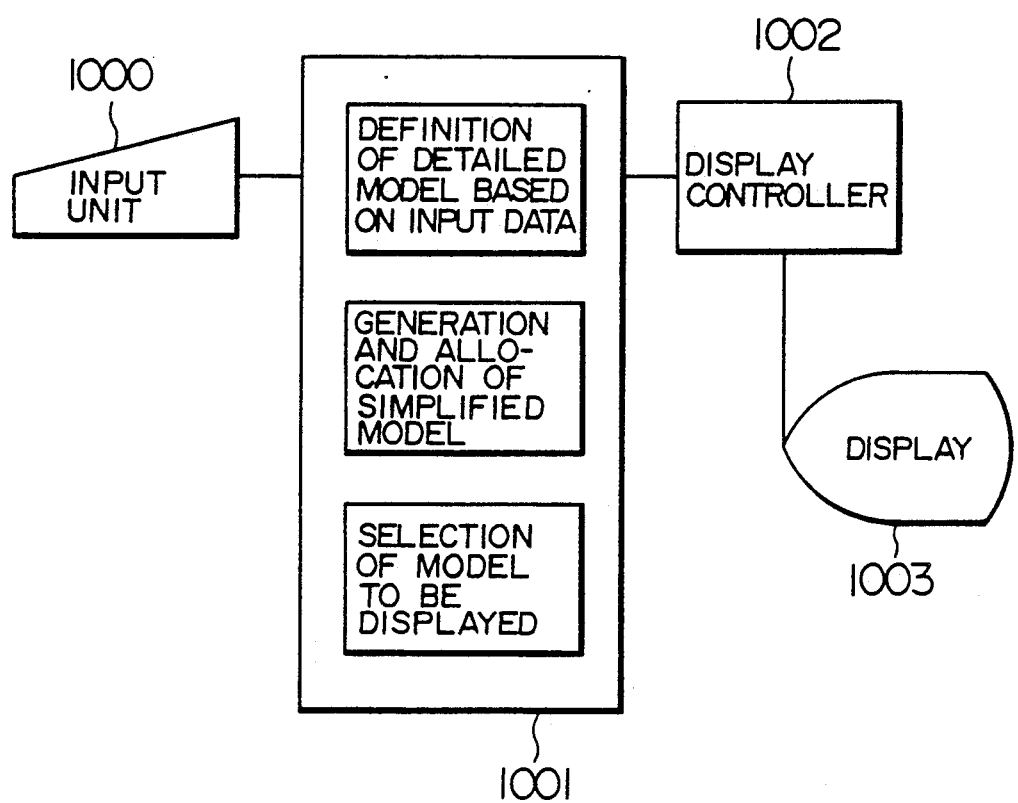

FIG. 1D shows schematically a hardware structure for carrying out the present invention. Referring to the figure, an input unit 1000 may be constituted by a keyboard, tablet or the like device and is used for inputting the model information or data together with the display control data. A computer 1001 serves for executing algorithms according to the present invention and controlling the input/output functions. More specifically, the computer 1001 is composed of a first memory serving as an input and definition unit for the detailed model, an arithmetic unit for generating the simplified model, and a selection unit serving for storage and selection of the simplified models for allocation. A display control apparatus 1002 performs conversion of a digital signal outputted from the computer 1001 to an analog signal to be supplied to a display unit 1003 adapted to display on a screen thereof a picture or scene under the control of the display controller 1002. Parenthetically, the display unit may be constituted by a three-dimensional display device based on holography or a similar technique.

Now, operation of the individual units of the illustrated system will be described by reference to FIG. 2 on the assumption that the present invention is carried out with the aid of computer software, being understood that the invention can equally be realized in hardware.

Figure 2:
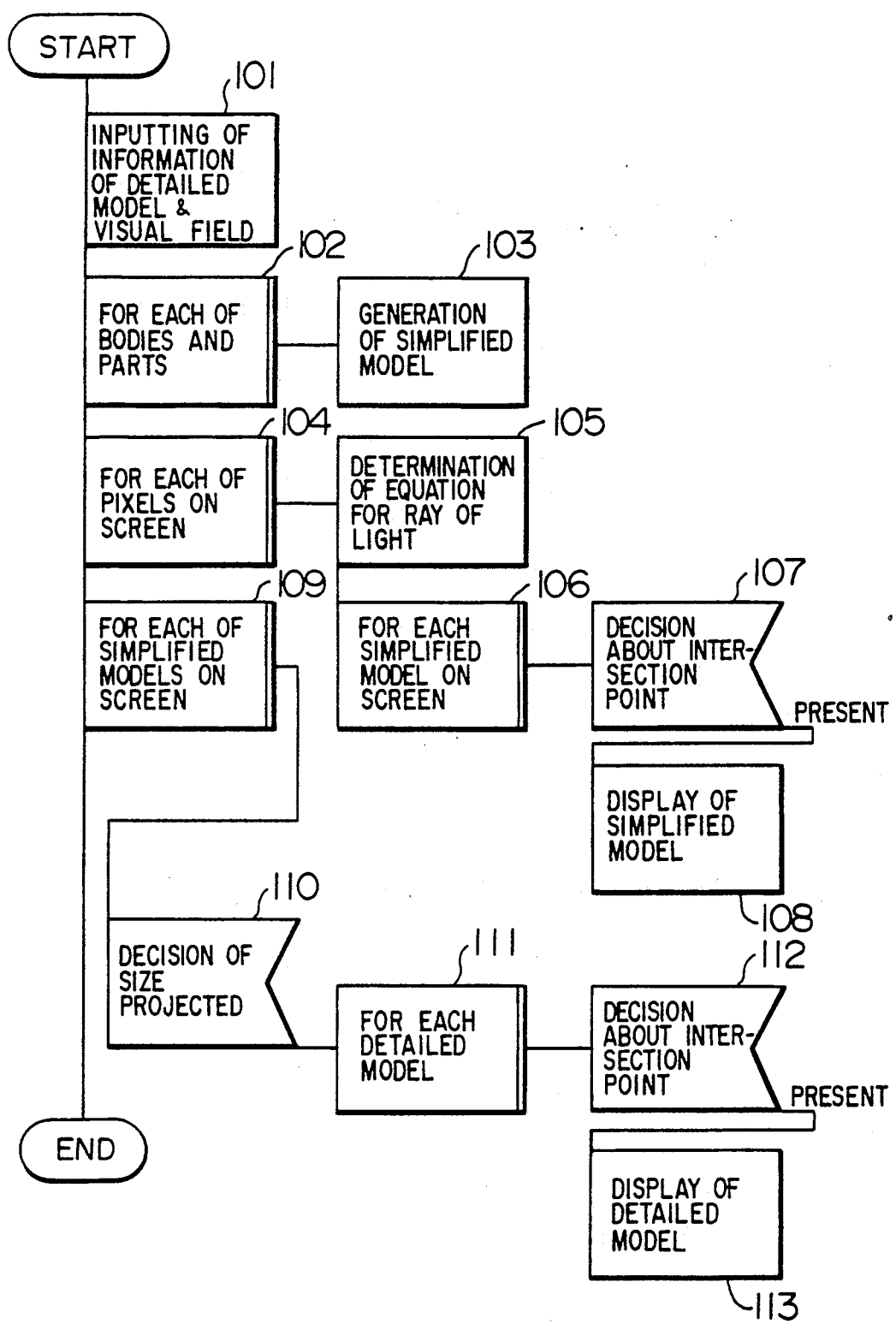
FIG. 2 shows in a flow chart a procedure for realizing the present invention in accordance with a computer algorithm.
Figure 3:
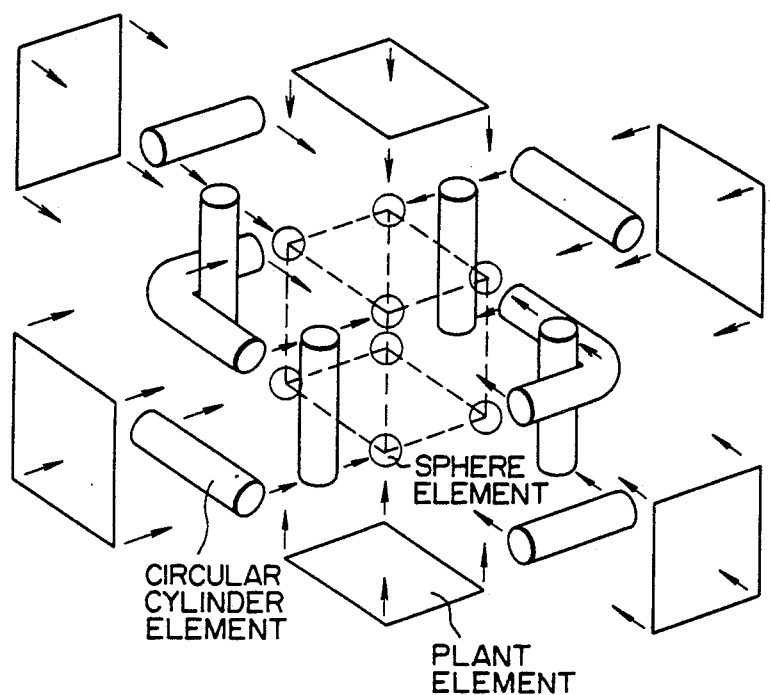
FIG. 3 is a schematic view showing various graphic elements which constitute a detailed model of a body.

Referring to FIG. 2, at a step 101, information of a detailed model and that of the visual field, as required for generating the display, are inputted. By way of example, it is assumed that a detailed model 3 is in the form of a rectangular prism having rounded corners. In that case, the detailed model 3 may be considered as being composed of eight spherical elements, twelve circular cylinder elements and six plane elements, as is shown in FIG. 3. This detailed model will be referred to as a part 1. A hierarchical structure of graphic elements may be represented by such a tree structure as illustrated in FIG. 4.

Figure 4:
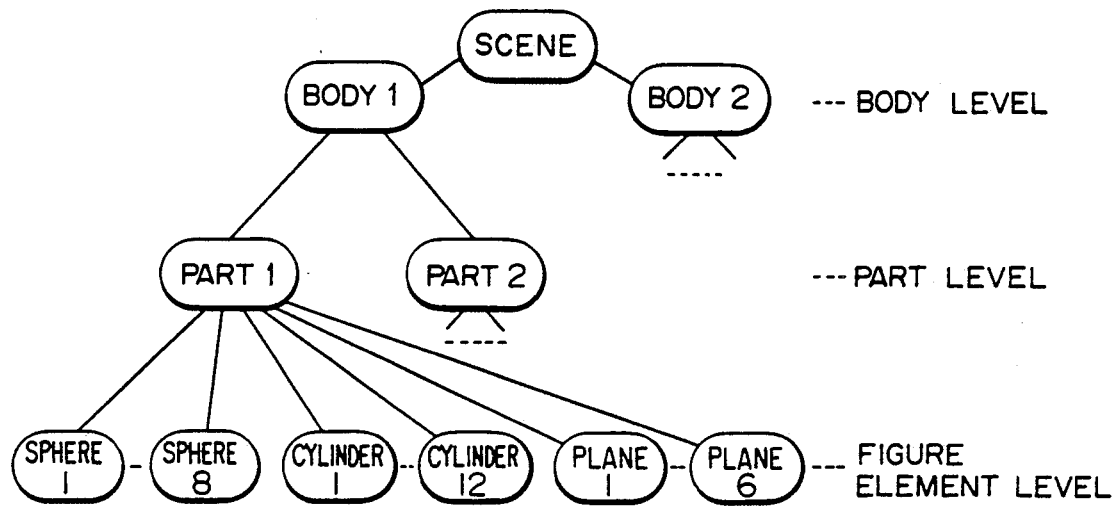
FIG. 4 shows a tree diagram for illustrating a hierarchical structure of graphic elements.

As will be seen in FIG. 4, a scene of concern is assumed to include a number of bodies each of which is constituted by a number of parts, wherein each of the parts in turn is constituted by a number of graphic elements. At this juncture, the hierarchical level of the bodies will be referred to as the body level. Similarly, the hierarchical level of the parts is referred to as the part level with that of the graphic elements being termed the graphic element level. In this manner, it is possible to define a geometrical configuration or shape of a three-dimensional model in terms of a set of graphic elements in the computer on the basis of the input information of the detailed model. On the other hand, the information of the visual field is utilized for determining the positions of the visual point 1 and the screen 2 (FIGS. 1A to 1D) in the three-dimensional space and thus may be given in terms of the coordinate values of an orthogonal (X-Y-Z) coordinate system. Further, as to the screen, data of the size and plane orientation thereof are inputted. Besides, in order to make decision as to how many number of pixels (picture elements) a body should occupy on the screen at the minimum when it is displayed in the form of the detailed model, data of a minimum body size prerequisite for the display of the detailed model is inputted as well. In brief, at the instant step 101, information of the three-dimensionally configured model of a body is inputted as the data for the detailed model together with the information of the visual field such as the position of the visual point, position of the screen and others required for generating the display, wherein the information as inputted is stored in a first memory unit.

In a step 102 (FIG. 2), data of the tree structure illustrated in FIG. 4 is searched on the basis of the information of the detailed model inputted at a step 101. In the case of the illustrated embodiment, when a simplified model is to be created at the part level in the tree structure shown in FIG. 4, this tree structure is searched to detect a part located at the part level as exemplified by the part 1.

Figure 5:
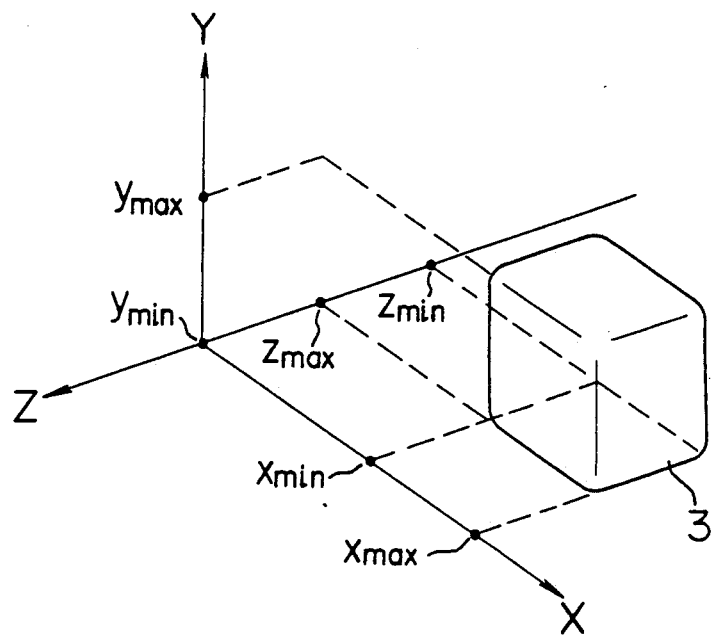
FIG. 5 is a schematic diagram for illustrating a method of determining or deriving a simplified element from a detailed element.
Figure 6:
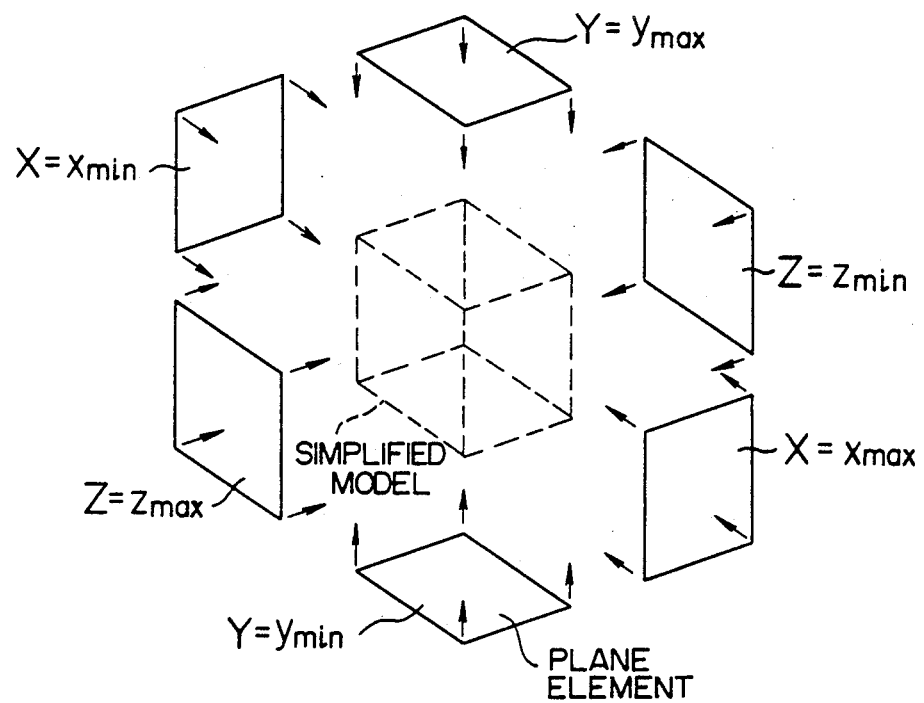
FIG. 6 is a schematic diagram showing a set of planes constituting a simplified model.
Figure 7:
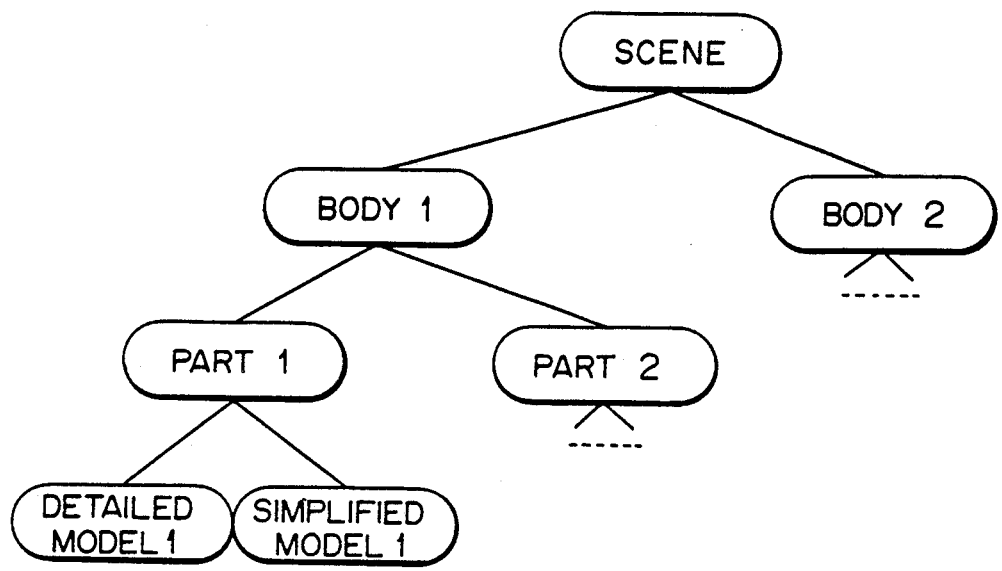
FIG. 7 shows a tree structure of graphic elements after allocation of simplified models.

At a step 103, a simplified model is created for the detailed model as inputted in accordance with an algorithm mentioned hereinbelow. At this juncture, the detailed model is defined as a set of the graphic elements such as those shown in FIGS. 3 and 4. The simplified model may then be represented by a parallelepiped circumscribing the detailed model, wherein the circumscribing parallelepiped can be created by determining the maximum and minimum values of the X-, Y- and Z-coordinates of a projection of the detailed model in a XYZ-coordinate system in such a manner as illustrated in FIG. 5. As will be seen in this figure, the maximum and minimum values of the detailed model projected on the X-axis are represented by $x_{max}$ and $x_{min}$. In the similar manner, the maximum and minimum values $y_{max}$, $y_{min}$ and $z_{max}$, $z_{min}$ can be determined. From these maximum and minimum values equations of six planes $X=x_{max}$, $X=x_{min}$, $Y=y_{max}$, $Y=y_{min}$, $Z=z_{max}$ and $Z=z_{min}$ can be formulated. The three-dimensional model defined by these equations representing the six planes is used as the simplified model. The detailed model as inputted is constituted by 26 graphic elements in total, as shown in FIG. 3, wherein each of the graphic elements has parameters such as radius, length and others. On the other hand, the created simplified model represented by the circumscribing rectangular parallelepiped can be described with six parameters which designate the six equations mentioned above. Thus, it is safe to say that the instant step 103 is equivalent to the arithmetic means which decreases the number of parameters of the detailed model. Additionally, since the simplified model includes no quadratic surface such as those of the spherical element and the circular cylinder elements constituting the attributes of the detailed model, this step 103 is also equivalent to the arithmetic means for decreasing the number of dimensions of the detailed model. Further, the data structure shown in FIG. 4 is altered to such a tree structure as illustrated in FIG. 7 after the creation of the simplified model. It will be seen that while the detailed model 3 is constituted by a set of 26 graphic elements, as shown in FIG. 3, the simplified model 4 is the single circumscribing rectangular parallelepiped such as illustrated in FIG. 6. In this manner, one and the same part is allocated with two models, i.e. the detailed model and the simplified model.

In a step 104 shown in FIG. 2, the processing routine extending from a step 105 to a step 108 is repeatedly executed for each of the pixels on the screen 2. The screen 2 is constituted by (m×n) pixels as shown in FIG. 1 and usually imparted with a resolution which coincides with that of the display unit 1003. Accordingly, the processing up to the step 108 is repetitively executed (m×n) times.

At a step 105, an equation for the ray of light 5 shown in FIG. 1A is determined. At the step 101, the information about the visual field has been inputted, and thus the positions of the visual point, the screen and the individual pixels (picture elements) are already known. The ray of light 5 represents a straight line interconnecting the position $P_v$ of the visual point and the position $P_s$ of one pixel on the screen 2. When position vectors of the positions $P_v$ and $P_s$ are represented by $_v$ and $_s$, the equation for the ray of light 5 and hence the straight line mentioned above can be described by t ($_s - _v$, where t is a parameter. Although the position $P_v$ of the visual point is fixed, the position $P_s$ on the screen 2 can assume (m×n) different values. Consequently, (m×n) equations for the rays of light are determined.

Figure 8:
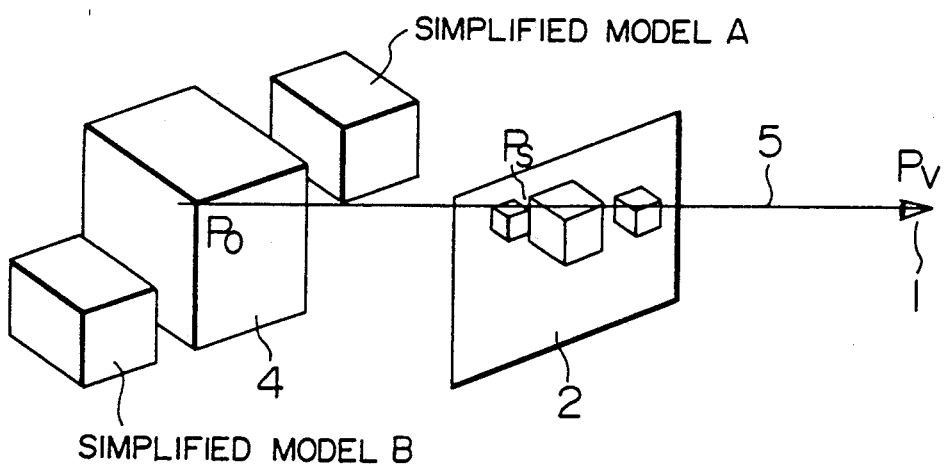
FIG. 8 is a schematic diagram illustrating a method of projecting a simplified model onto a screen.

In a step 106, the routine including the steps 107 and 108 is repeatedly executed for each of the simplified models created at the step 103. As is shown in FIG. 8, there are usually created a plurality of simplified models. In other words, in addition to the simplified model 4, there exist simplified models A and B. At the instant step 106, all of these simplified models are detected from the tree structures shown in FIG. 7 for each of the rays of light 5 determined at the steps 104 and 105, whereupon the processing in the steps 107 and 108 are repeatedly executed.

The step 107 serves as the decision means for deciding whether or not the ray of light 5 has a point of intersection with each simplified model. The equation for the ray of light 5 is the equation for the straight line determined at the step 105 while the simplified model is described by the equations for the six planes shown in FIG. 6. Accordingly, the decision of the presence or absence of the intersection point is equivalent to the decision as to whether intersection exists between the straight line and the equations or planes. In other words, when the ray of light being processed passes through the inner regions of six planes defining the simplified model, decision is made that the intersection point is present.

At the step 108, the simplified model is displayed when the intersection point has been detected at the step 107. Detection of the presence of the intersection point means that the image of the simplified model is also projected onto the screen 2 by the ray of light being processed. Consequently, the simplified model is displayed on one pixel on the screen which the ray of light passes through However, when there exist a plurality of intersection points, the one located closest to the visual point is taken as the subject to be displayed. Upon completion of the processing up to the step 108 for all the pixels on the screen, there have thus been projected and plotted on the screen all the simplified models, as shown in FIG. 8.

In a step 109, the simplified models plotted on the screen till the step mentioned just above are detected, whereupon the processing from the step 110 to the step 113 is repeatedly executed The screen has data in the form of a two-dimensional array of (m × n) pixels. Thus, through retrieval of these array data, the simplified models can be detected.

At the step 110, decision is made as to the size of the simplified model projected and plotted on the two-dimensional screen. It is now assumed, by way of example, that two simplified models 7 are projected and plotted on the screen 2, as is illustrated in FIG. 9 For the decision, a size ($u_1$, $v_1$) projected on the plane screen in the horizontal direction (u) and in the vertical direction (v) may be employed as the reference. More specifically, decision is made whether or not the values $u_1$ and $v_1$ exceed the corresponding values of the minimum size required for displaying the detailed model inputted at the step 101.

In the step 111, the data of the simplified model for which decision has been made on the basis of the size projected on the screen at the step 110 that the detailed model is to be displayed is exchanged by the data for the detailed model, whereupon steps 112 and 113 are repeatedly executed for each detailed model. The detailed model is ordinarily composed of a large number of graphic elements, as illustrated in FIG. 3. Accordingly, the steps 112 and 113 are repeatedly executed for all of these graphic elements.

The step 112 is provided as the means for deciding the presence or absence of the intersection point on the graphic elements of the detailed model. In other words, decision is made as to whether the rays of light passing through the individual pixels on the screen intersect the graphic elements, similarly to the step 107.

At the step 113, the pixel at the position $P_s$ at which the ray of light decided as having the intersection at the step 112 passes through the screen is displayed as a part of the detailed model through the similar procedure described hereinbefore in conjunction with the step 108.

As will be seen from the foregoing description, according to the teaching of the illustrative embodiment of the present invention described above, a simplified model is created from information of a detailed model as inputted by decreasing the number of parameters or that of dimensions of the detailed model in accordance with the algorithm mentioned above, whereby the simplified model for which the decision as to the presence or absence of the intersection point can easily be made is first displayed, being followed by the display with the detailed model only for the body which is projected in a large size on the screen and which thus requires the detailed information. According to this procedure, the processing required for the display can be accomplished at a higher speed when compared with the case where all the bodies are displayed with the detailed models. It is further noted that the simplified models need not be manually inputted because they are automatically created, which is another advantage.

In the case of the illustrative embodiment described above, those bodies which are projected on the screen in large sizes are displayed with the detailed models. However, it is also possible to terminate the processing at the time when the simplified model is displayed so that no detailed model is displayed at all. To this end, the processing can be terminated at the stage where the step 108 shown in FIG. 2 has been completely executed. When all the bodies are displayed by the simplified models, time consumption involved in the processing for the display can be significantly reduced. This procedure can be adopted for checking the general shape or configuration of a body as well as for other purposes.

In the foregoing, it has been described that the change-over from the simplified model to the detailed model is performed in accordance with an algorithm established to this end. It should however be mentioned that such change-over of the models may also be decided by the user or operator To this end, the processing at the step 110 shown in FIG. 2 may be replaced by an interactive procedure which permits the intervention of operator. The interactive procedure may then be so prepared that the simplified models plotted on the screen as shown in FIG. 9 are displayed on the display unit as they are, so that the simplified model to be replaced by the detailed model can be designated by the operator viewing the display with the aid of a pointer device such as stylus pen or the like. By commanding the exchange of the simplified model with the detailed model through the interactive procedure in this manner, it is also possible to allow the simplified model to remain in the displayed state at the will of the operator, thus allowing realization of the intentional simplified display.

Figure 10:
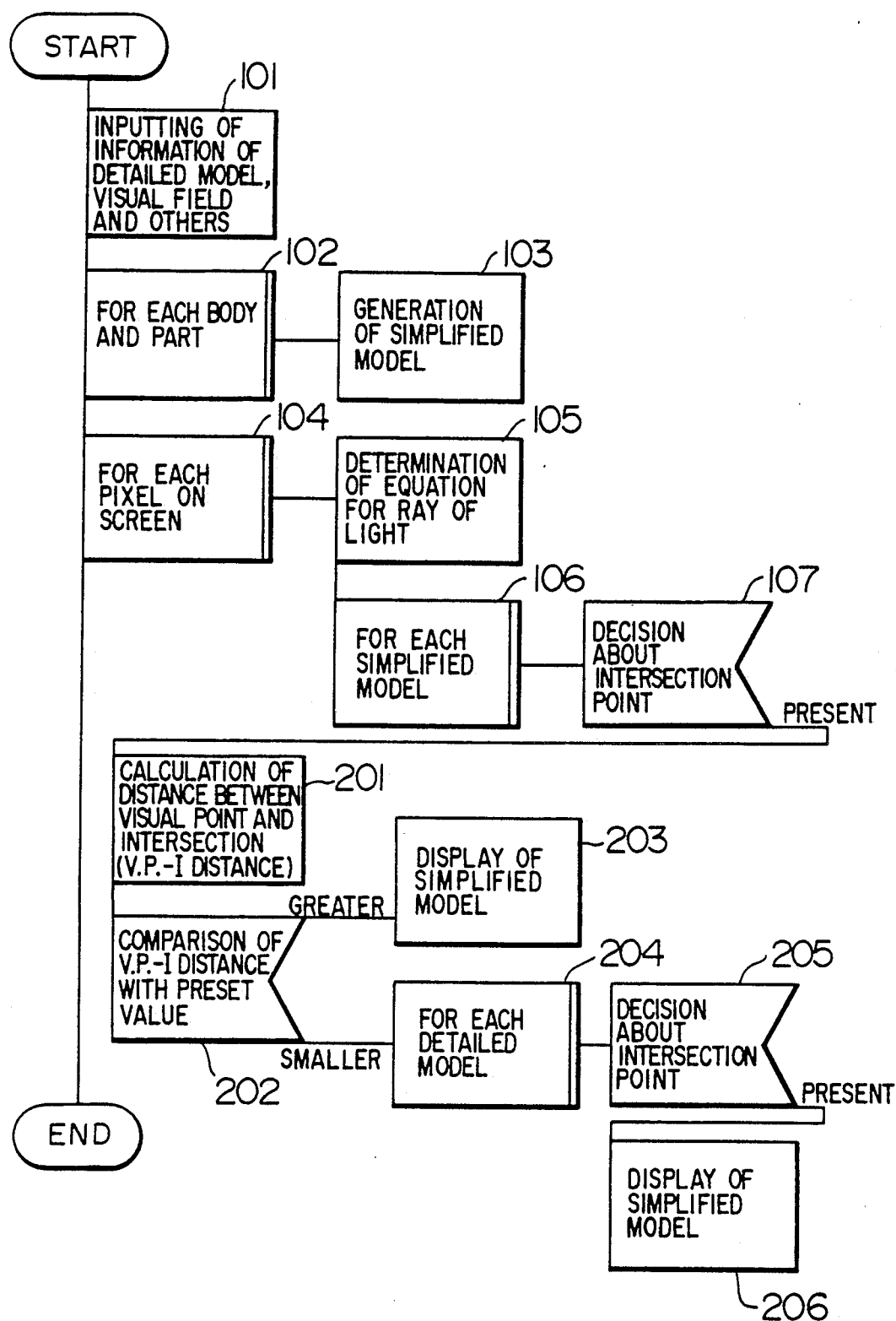
FIG. 10 is a flow chart for illustrating a displaying procedure according to an embodiment of the present invention in which models to be displayed are changed over depending upon a distance between an intersection point on a model to be displayed and a visual point.

According to one of the methods for changing over to the detailed model, the distance extending from the visual point to the simplified model to be replaced can be made use of as a reference. This method is illustrated in a flow chart in FIG. 10. Referring to the figure, at a step 101, a value preset for the changeover of models based on the distance between the visual point and the intersection point is inputted in addition to the information of the detailed model and the visual field information. The succeeding steps 102 to 107 have the same contents as the corresponding steps described hereinbefore by reference to FIG. 2. Accordingly, repeated description of these steps will be unnecessary. At a step 201, distance between the visual point and the intersection point is calculated on the basis of the position of the intersection of the ray of light with the simplified model as determined at the step 107. As will be seen in FIG. 8, the visual point $P_v$ and the intersection point $P_o$ on the simplified model constitute two points on the line representing the ray of light. Accordingly, the distance between these two points can be easily calculated At a step 202, the distance between the visual point and the intersection point is compared with the preset value of the distance inputted at the step 101. When the calculated distance is greater than the preset value (i.e. when the visual point is located relatively remotely from the intersection point on the simplified model), the simplified model is displayed at the pixel positioned at $P_s$ on the screen (FIG. 8) at a step 203. On the other hand, when the calculated distance is smaller than the input preset value (i.e. when the intersection point on the simplified model is located relatively closely to the visual point), the detailed model is displayed on the pixel positioned at $P_s$ by executing steps 204 to 206 in the similar manner as in the case of the steps 111 to 113 described hereinbefore by reference to FIG. 2. By changing over the simplified model to the detailed model in dependence on the distance from the visual point in this way, speeding-up of the processing can be achieved because the number of processing steps involved in displaying the simplified model can be decreased by virtue of the discriminative selection of the simplified model or the detailed model already made at the step 202 instead of displaying all models once by the simplified models and then changing over them sequentially to the detailed models.

Figure 11:
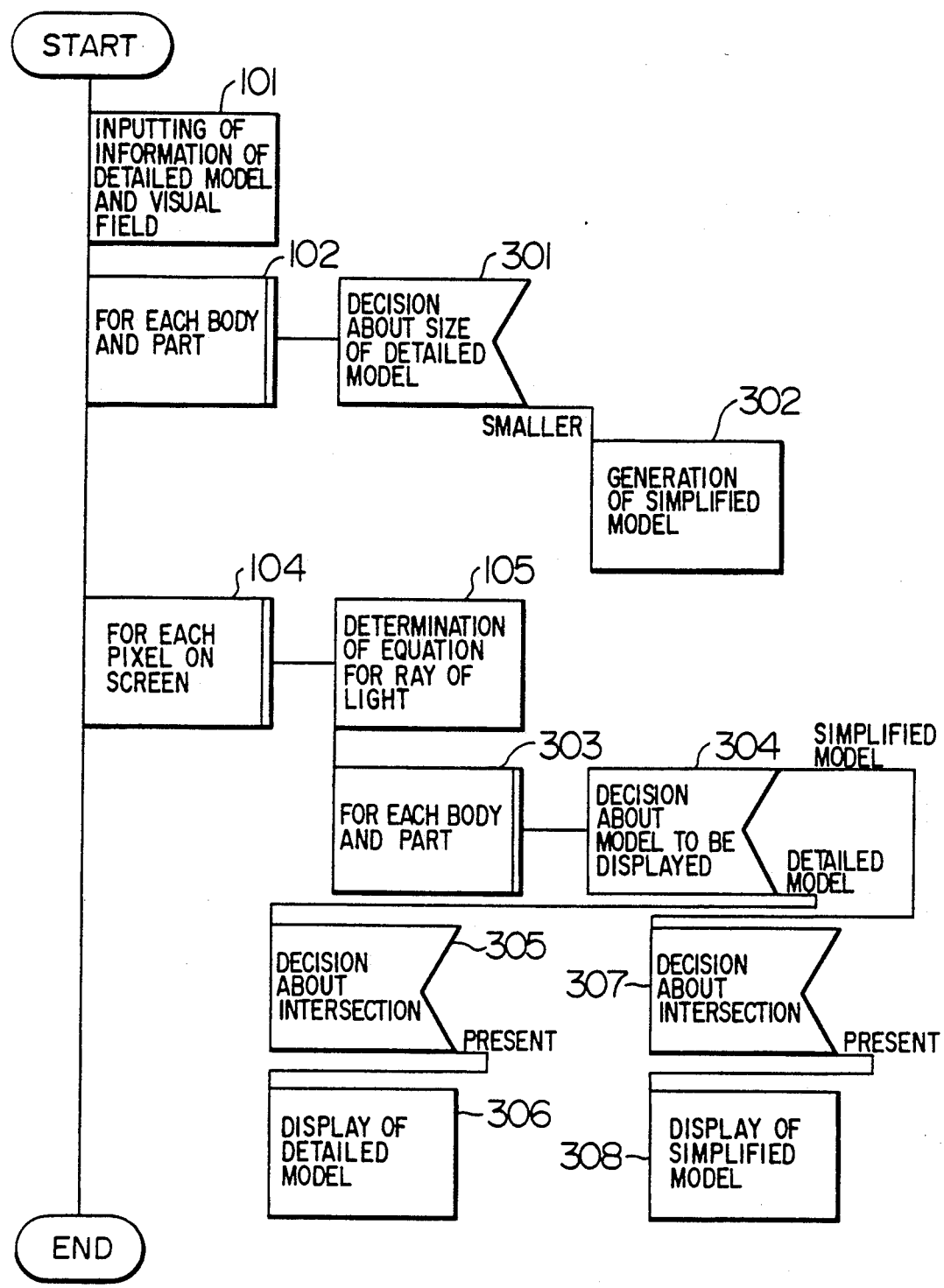
FIG. 11 is a flow chart for illustrating a displaying procedure according to another embodiment of the present invention in which models to be displayed are changed over depending upon the size of a simplified model.
Figure 12:
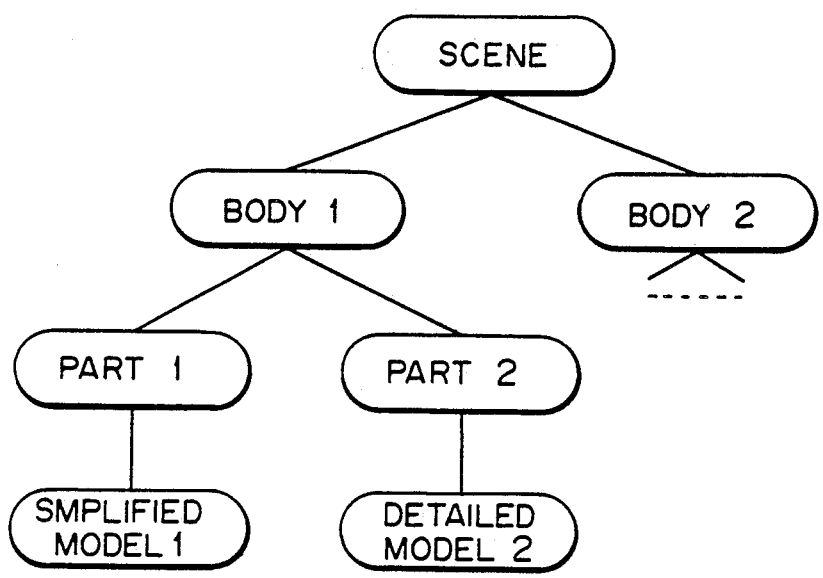
FIG. 12 shows a hierarchical tree structure for illustrating allocation of models in the procedure shown in FIG. 11.

It is further to be noted that the change-over between the simplified model and the detailed model may be effectuated on the basis of the size of the model itself. FIG. 11 shows this method in a flow chart. At an input step 101, values preset for creating the simplified model in dependence on the size of model are inputted in addition to the information of the detailed model and the visual field information. The step 102 is same as the corresponding step shown in FIG. 2. At a step 301, the size of the detailed model is decided through the procedure described previously by reference to FIG. 5. Namely, the detailed model is projected in the X-, Y- and Z-directions, respectively, to thereby determine the size of the model. The size of the detailed model thus determined is then compared with the preset values as inputted. When the former is smaller than the latter, the simplified model is created at a step 302. Additionally, at the stage of this step 302, the simplified model created for each body or part is so replaced by the detailed model that either one of the detailed model or the simplified model can be allocated to each body or each part, as is illustrated in FIG. 12. The steps 104 and 105 are same as the corresponding steps shown in FIG. 2. At a step 303, the model corresponding to a body or a part is detected in the data structure shown in FIG. 12, being followed by repeated execution of steps 304 to 308. At the step 304, it is decided whether a model allocated to a body or part of concern is the detailed model or the simplified model. In case the allocated model is the detailed model, processing for displaying it is carried out through the steps 305 and 306. On the other hand, when the allocated model is the simplified model, the displaying processing is performed through the steps 307 and 308. As will now be seen, when the change-over to the simplified model is performed in dependence on the size of the model, the simplified model can be displayed independent of the position of the visual point, because the simplified model is allocated only on the basis of the shape or configuration data of the input model. In other words, only the body of small size can be displayed as the simplified model independent of the position of the visual point.

Figure 13:
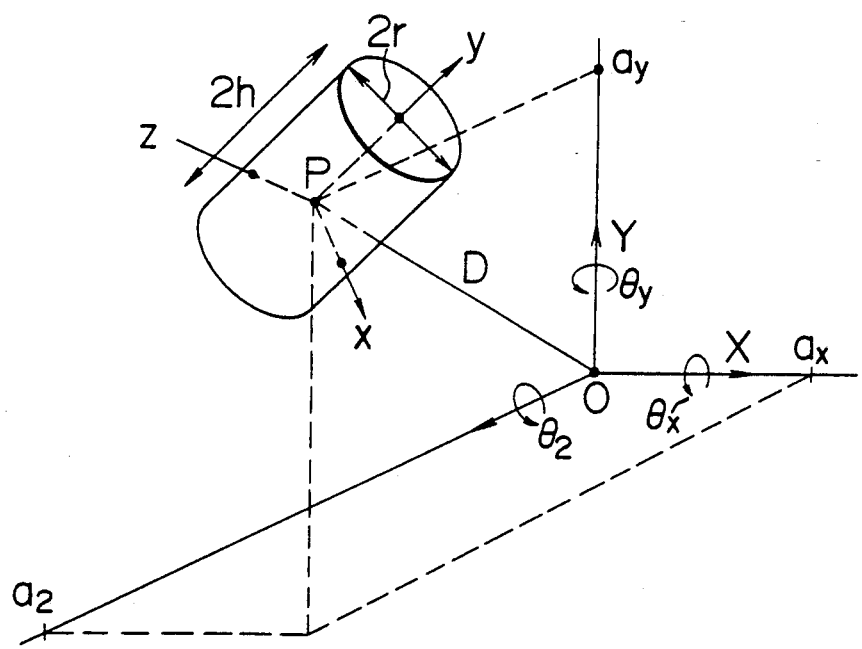
FIG. 13 is a schematic diagram illustrating model information of a graphic element.
Figure 14:
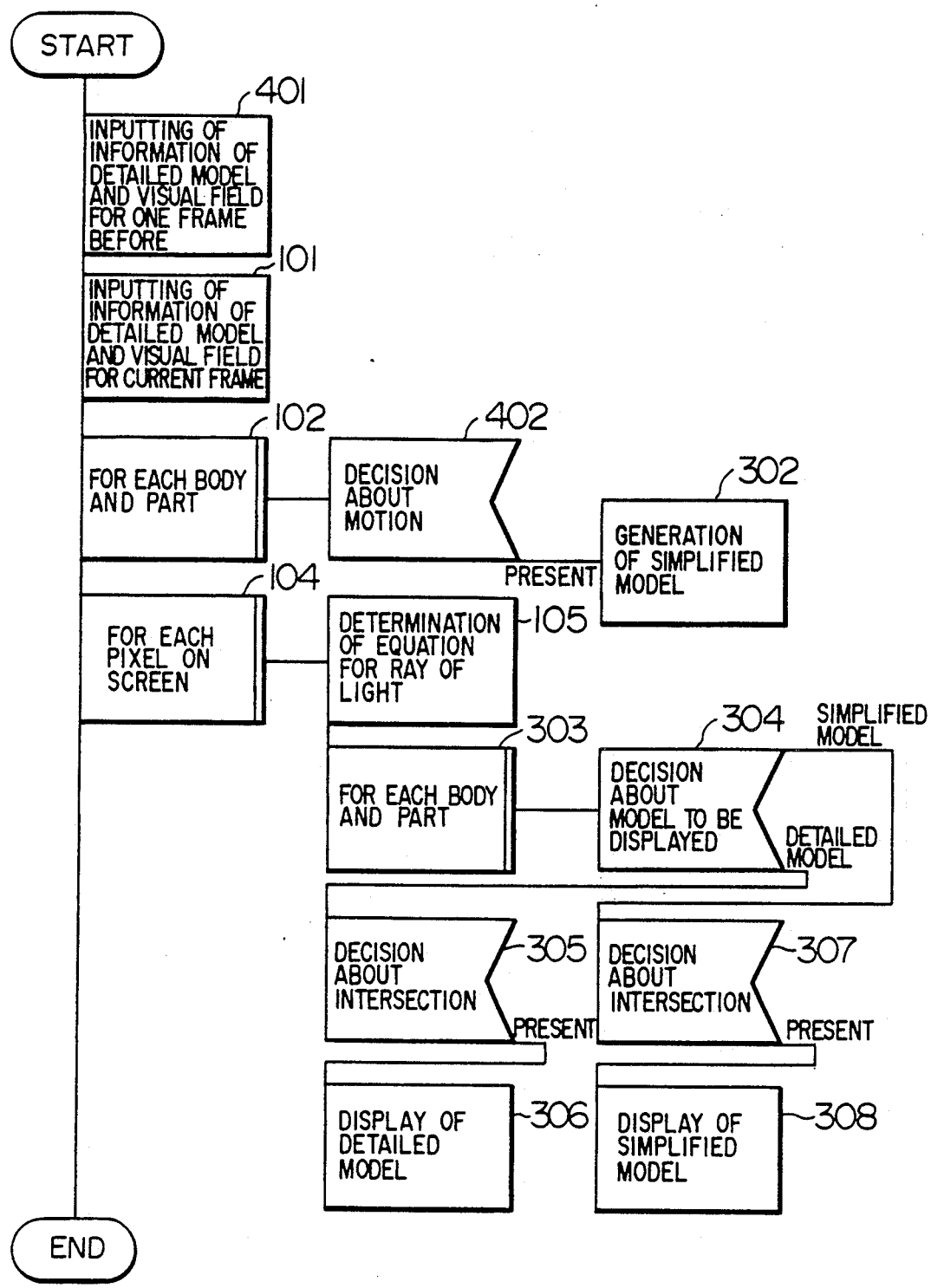
FIG. 14 is a flow chart illustrating a displaying procedure according to still another embodiment of the present invention in which change-over of models is effectuated for a moving body.

In the computer graphics, an animated display is realized by displaying successively still pictures each prepared for one frame at a speed on the order of 30 frames/second. In connection with the animated display, it is possible to display only the body moving in the displayed scene in the form of a simplified model. FIG. 13 illustrates, by way of example, the contents of model information of a graphic element (circular cylinder) shown in FIGS. 3 and 4. Referring to FIG. 13, reference character $2h$ represents the length of the circular cylinder, and $2r$ represents the diameter thereof. These data are referred to as the primitive information or data. Further, the coordinates $a_x$, $a_y$ and $a_z$ define the position of the center P of the circular cylinder relative to the origin O, while $o_x$, $o_y$ and $o_z$ represents angles of rotation indicating the orientation of the circular cylinder These data $a_x$, $a_y$, $a_z$; $o_x$, $o_y$, $o_z$ are called layout information. When a body is moving on the display or screen, this firstly means that the layout information changes from one to another frame and secondly means that the visual field information changes. Now, referring to FIG. 14, description will be made of a method for displaying a simplified model for a model moving in a displayed scene. At a step 401, information of the detailed model and the visual field for a frame which precedes to the frame being currently processed by one frame is inputted, while the information of the detailed model and the visual field for the current frame is inputted at the step 101. The step 102 is same as the corresponding one shown in FIG. 2. At a step 402, motion of the model is decided. To this end, changes in the layout information and the visual field information inputted at the steps 401 and 101 are detected. When it is decided on the basis of the results of the detection that the body of concern is in motion, the detailed model therefor is replaced by the simplified model at a step 302, as illustrated in FIG. 12. The following steps are substantially same as the steps denoted by like reference numerals in FIG. 11. In this manner, only the moving body can be represented by the simplified model. In the animated display, it is difficult to fix the eyes on a body moving in a scene, making it impossible to recognize the model to the details thereof. Accordingly, by displaying the moving body in the form of a simplified model, speeding-up of the processing can be accomplished without being accompanied with any appreciable deterioration in the quality of the picture as a whole.

Figure 15A:
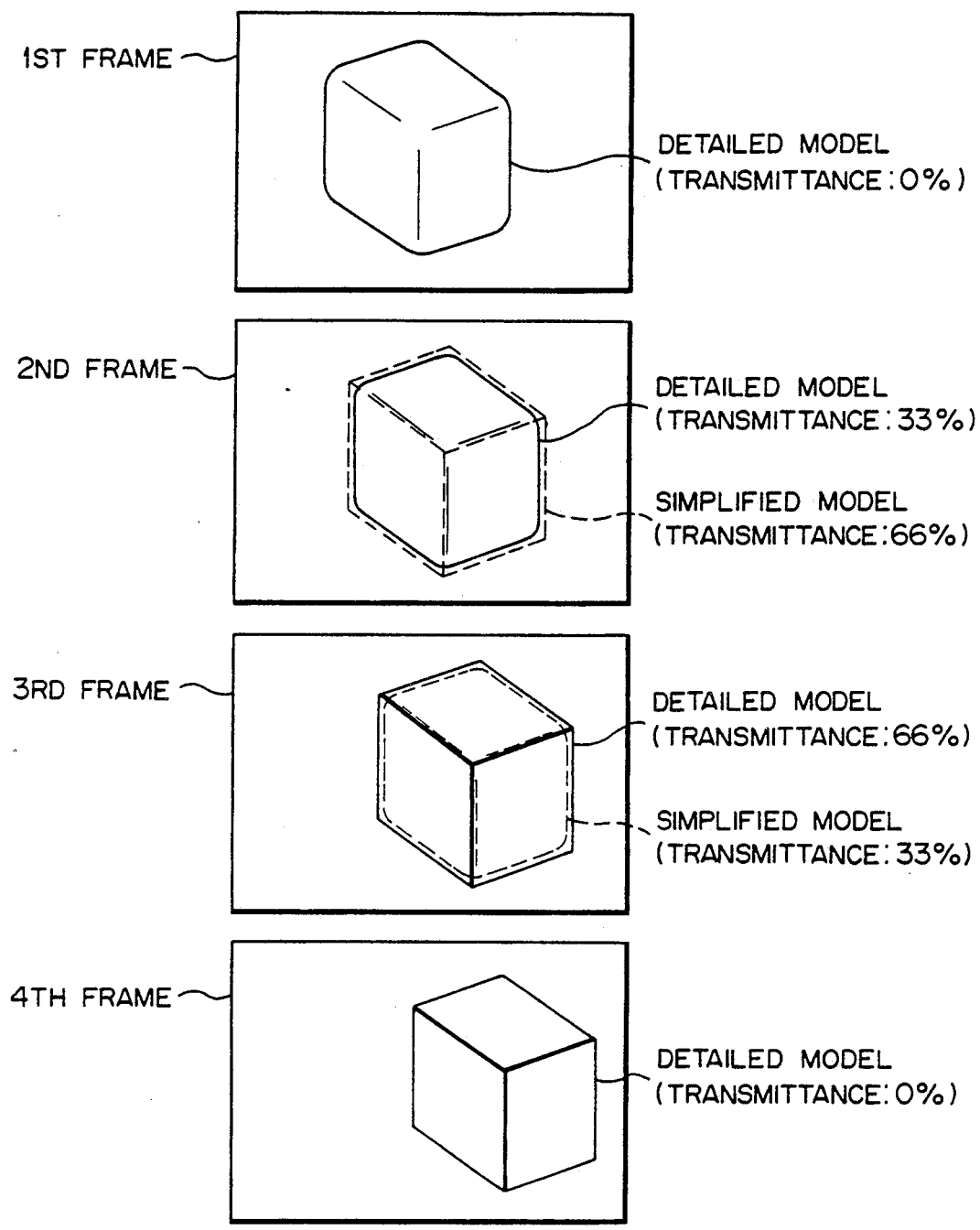
FIGS. 15A and 15B show in a schematic diagram and a flow chart, respectively, the displaying procedure according to a further embodiment of the present invention in which change-over of models is performed progressively by varying transmittance thereof.
Figure 15B:
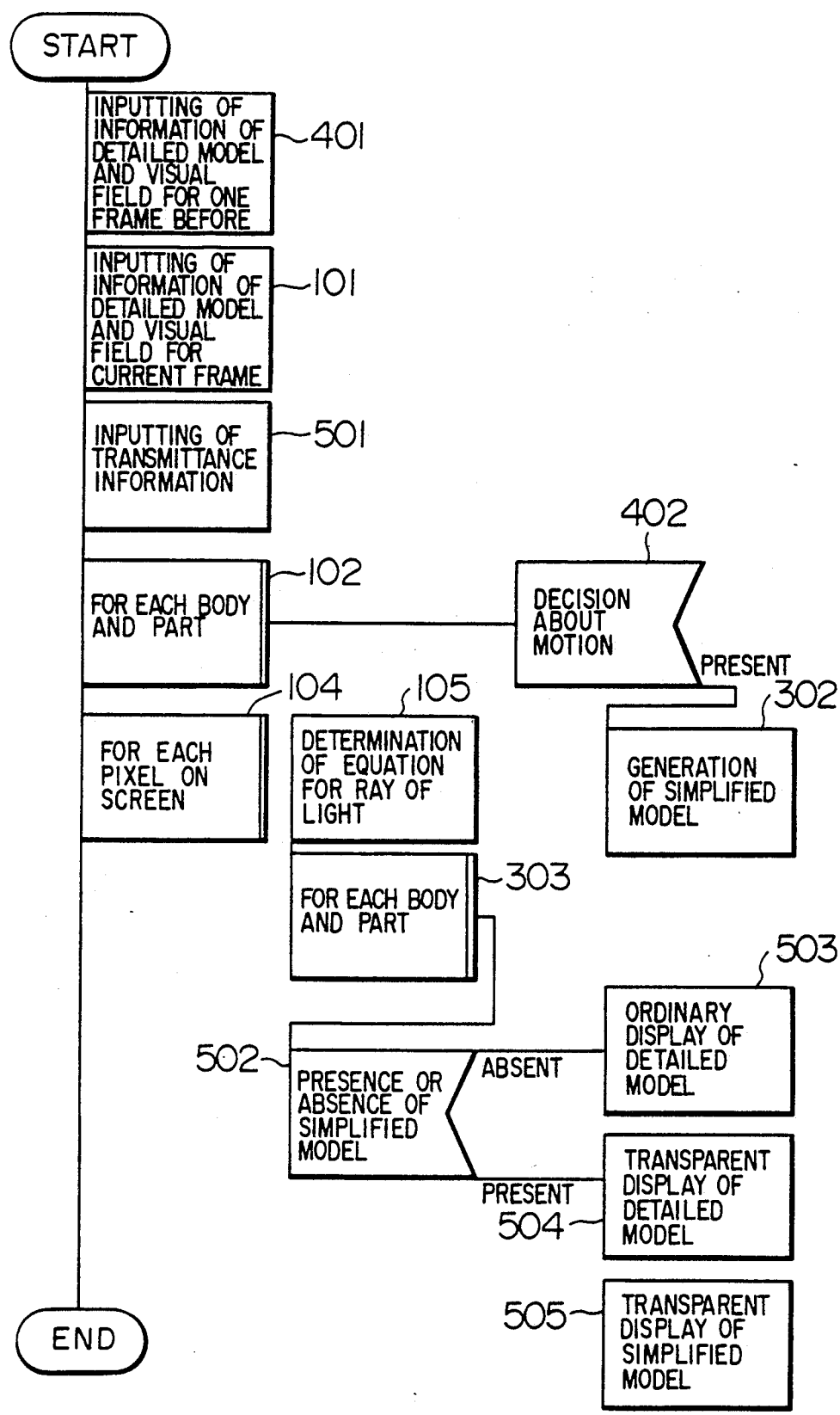

In the case of the embodiment of the invention described above, the change-over of the detailed model with the simplified model is instantaneously performed at the boundary between certain frames. According to another embodiment of the present invention, it is also proposed that transmittance of a model is defined to create a third model, wherein the transmittance of the third model is varied bit by bit to be thereby changed over to a simplified model. More specifically, it is assumed, by way of example, that a model displayed at the first frame corresponds to a representation by the detailed model such as shown at 6 in FIG. 1B, and that the model starts a motion from the second frame, whereupon the detailed model is changed over to the simplified form, which is however completed at the fourth frame. In the case of the transition from the first frame to the fourth frame, transmittance of the detailed model changes progressively in the order of 0%, 33%, 66%, while that of the simplified model undergoes change in the sequence of 100%, 66%, 33% and 0%, as is illustrated in FIG. 15A. In other words, the detailed model is so displayed that the image thereof becomes thinner progressively, while that of the simplified model becomes denser. Parenthetically, the term "transmittance" means the value indicating the ratio at which the ray of light transmits through a body. Thus, the transmittance of 0% is equivalent to a body which can be perfectly viewed, while the transmittance of 100% means that the body of concern is completely invisible. FIG. 15B illustrates the model change-over method based on the change in transmittance of a model. Referring to this figure, the steps 401 and 101 are same as the steps denoted by like reference numerals in FIG. 14. At a step 501, the information of transmittance of a model which has already started motion is inputted. In other words, information of transmittance of the detailed model and the simplified model in the current frame is inputted. The processing through the steps 102 to 303 is executed in the same manner as described hereinbefore in conjunction with the corresponding steps shown in FIG. 14. The step 305 and the following are for the decision of the intersection point between the model and the ray of light as well as for the display, as described hereinbefore. At a step 502, the presence or absence of the simplified model is detected. More specifically, detection is made as to whether or not a simplified model is allocated to a body or part in addition to a detailed model, for example, as in the case of a part 1 shown in FIG. 7. For the body to which no simplified model is allocated, the detailed model thereof is displayed. On the other hand, when the simplified model is allocated, transmittance display of the detailed model is first generated at a step 504, which is then followed by a step 505 where overlap writing of the simplified model with certain transmittance is performed. At this juncture, with the term "overlap writing", it is intended to mean that one pixel is displayed with a color resulting from mixing of colors of both models with the ratio of transmittances thereof. By way of example, let's represent the transmittance of the detailed model by A with the display color thereof by $C_1$ while representing the transmittance of the simplified model by $(1-A)$ with the color thereof by $C_2$. Then, the mixed color C can be arithmetically determined as follows:

$$C = A \cdot C_1 + (1-A)C_2$$

By realizing the change-over of the model from the detailed model to the simplified one by changing the transmittance in the manner described above, the detailed model and the simplified model are changed over while they are overlapping each other, whereby the display can be animated smoothly.

Figure 16:
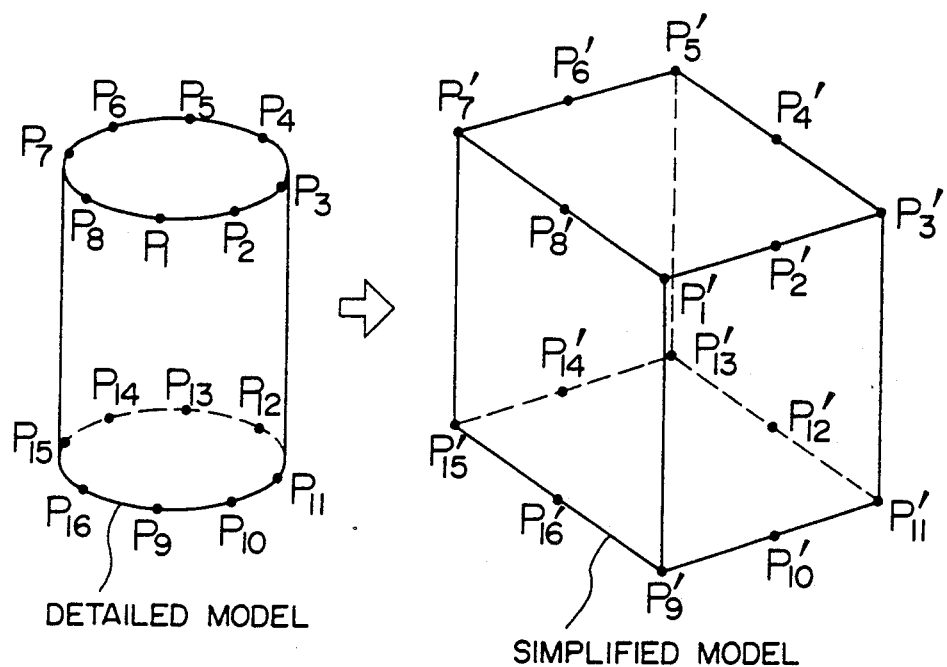
FIG. 16 is a schematic diagram showing correspondence of points on a detailed model and a simplified model.
Figure 17:
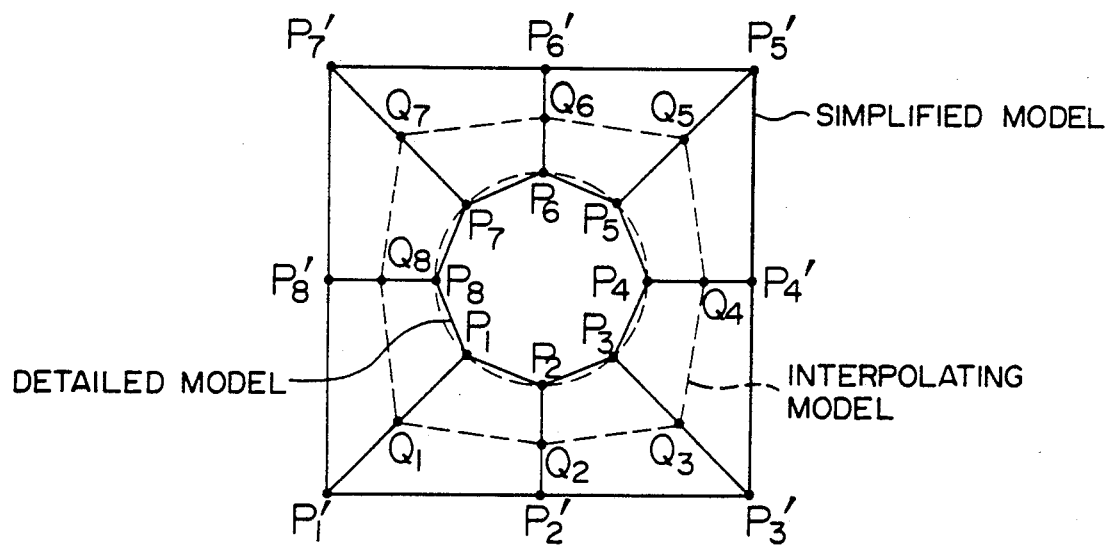
FIG. 17 is a plan view taken from the top of FIG. 16 and illustrates a method of creating an interpolating model.
Figure 18:
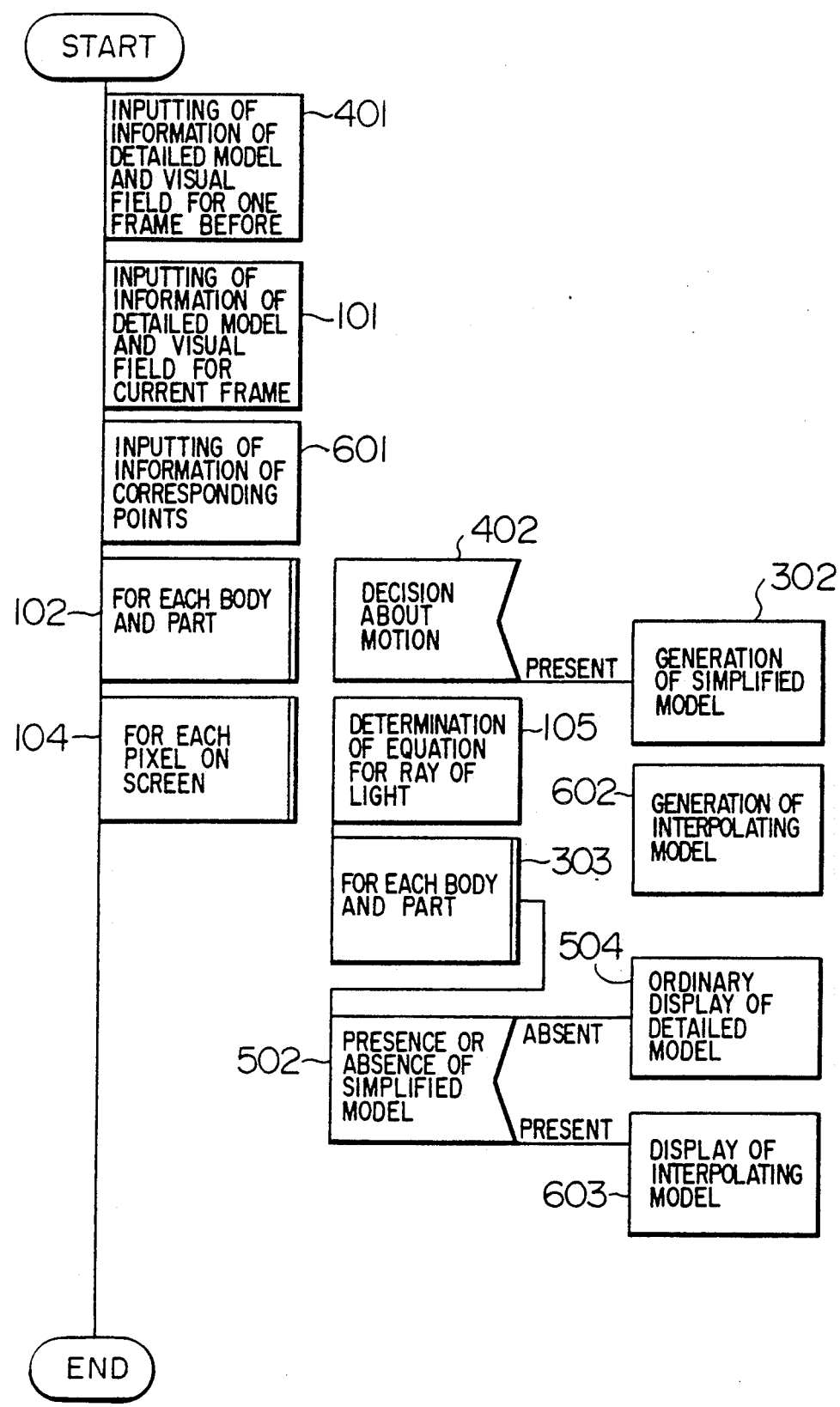
FIG. 18 is a flow chart illustrating a display procedure according to an embodiment of the present invention in which the change-over to a simplified model is effected by progressively deforming a detailed model.

As another method of changing-over stepwise a detailed model to a simplified model, it is proposed to deform progressively the detailed model to the simplified model, while the latter is displayed in coincidence with the former. Let's assume, by way of example, that the detailed model is in the form of a circular cylinder with the simplified model being in the form of a rectangular parallelepiped, as is illustrated in FIG. 16. For deforming progressively the circular cylinder into the rectangular parallelepiped, points bearing correspondence between both models are determined on each of the models. In the case of the illustrated embodiment now under consideration, points $P_1$ to $P_{16}$ are established on the detailed model, while corresponding points $P'_1$ to $P'_{16}$ are defined on the simplified model. FIG. 17 is a plan view taken from the top of FIG. 16 for illustrating a method of creating an interpolating model in the course of deformation of the detailed model to the simplified model both of which are shown in superposition to each other. Assuming now that the interpolating model to be created lies intermediately between the detailed model and the simplified model, points $Q_1$ to $Q_8$ on the interpolating model which correspond to the points P and P' on the detailed and the simplified model can be determined as middle points of the line segments $P_1P'_1$ to $P_8P'_8$, respectively. This method may be carried out in the manner illustrated in a flow chart in FIG. 18. In this figure, steps 401 and 101 are same as those denoted by like reference numerals in FIG. 15. At a step 601, information of the corresponding points is inputted to determine the corresponding points on the detailed model and the simplified model shown in FIG. 16. Steps 102 to 503 are same as those denoted by like reference numerals in FIGS. 15A and 15B and described hereinbefore. At a step 602, the interpolating model having a configuration or shape intermediate between those of the detailed model and the simplified model is created in such a manner as shown in FIG. 17. At a step 603, the created interpolating model is displayed. By changing over the detailed model to the simplified model by deforming the former progressively in this way instead of replacing instantaneously the detailed model by the simplified one, a smoothly animated display can be generated.

Figure 19A:
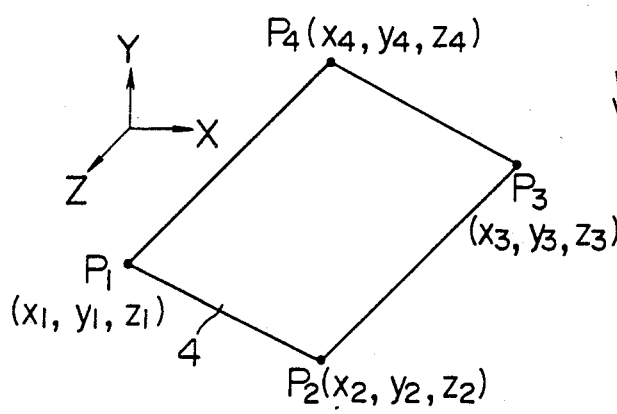
FIGS. 19A and 19B are schematic diagrams showing a simplified model and transmittance data, respectively.
Figure 19B:
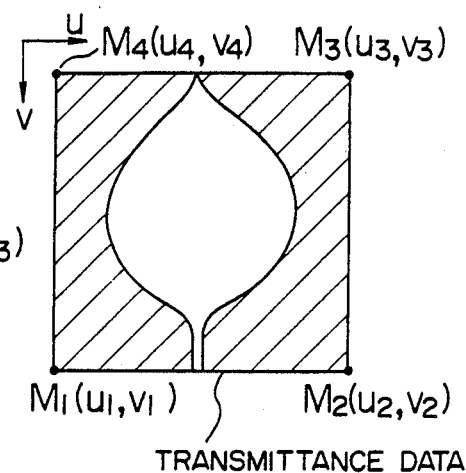
Figure 21A:
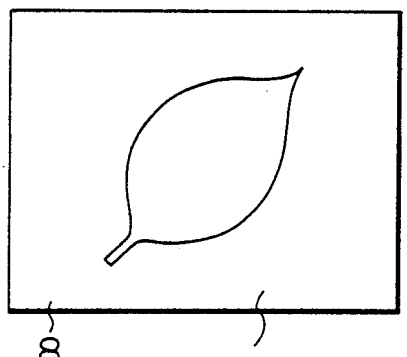
FIGS. 21A and 21B are schematic diagrams showing a detailed model and a simplified model, respectively, generated on a display according to the method illustrated in FIG. 20.
Figure 21B:
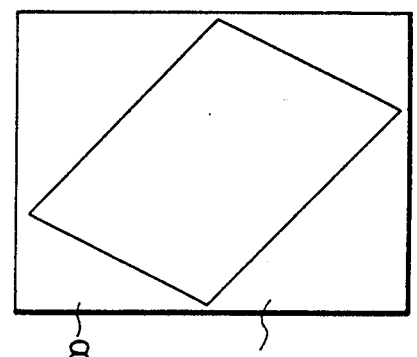
Figure 20:
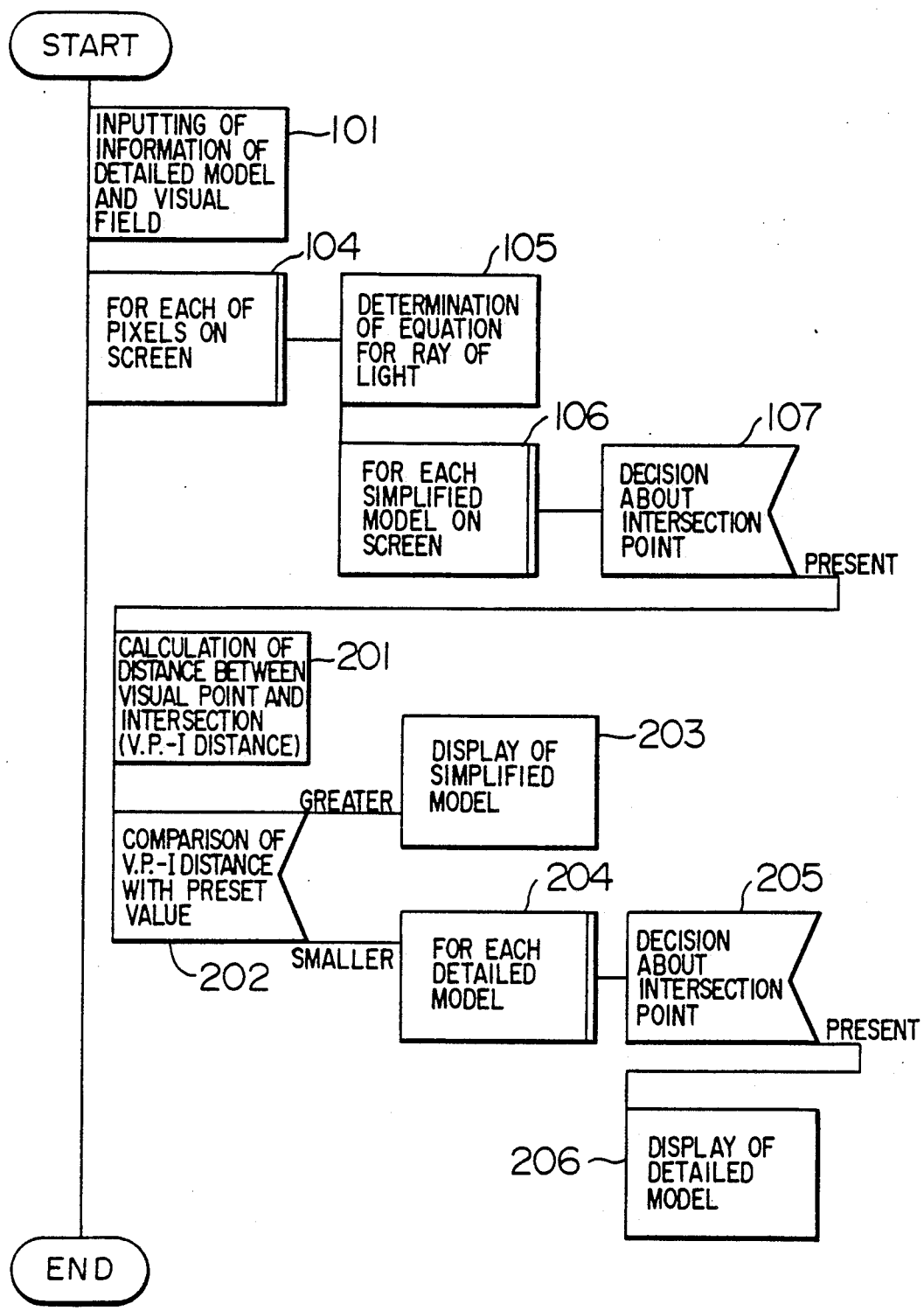
FIG. 20 is a flow chart illustrating a method of displaying a detailed model by applying the transmittance data to a simplified model through mapping.

According to a still further embodiment of the present invention, such a representation can also be generated in which instead of creating the simplified model from a detailed model, a three-dimensional simplified model is first defined in terms of configuration or shape data, while transmittance data describing the transmissivity of a body to the ray of light are stored as mapping data in the form of a two-dimensional table, wherein the detailed model is defined by a mapping means for transferring the mapping data onto the shape data model to be subsequently displayed. More specifically, referring to FIGS. 19A and 19B, the simplified model is defined as the three-dimensional shape data. In the case of the example illustrated in these figures, the coordinate values $(x_1, y_1, z_1)$ to $(x_4, y_4, z_4)$ of the four vertexes $P_1$ to $P_4$ of the simplified model are defined (FIG. 19A). The transmittance data is two-dimensional data having such a distribution as illustrated in FIG. 19B, wherein it is assumed that the hatched region has transmittance of 100% with the other region having transmittance of 0%. For mapping the transmittance data onto the simplified model by the mapping means, it is necessary to determine previously the correspondence relation between the simplified model and the transmittance data. In the case of the embodiment now under consideration, it is assumed, by way of example, that four corner points $M_1$ to $M_4$ of the transmittance data correspond to the four vertex points $P_1$ to $P_4$ of the simplified model, respectively. Correspondence relation to the other points than the vertexes can be determined through interpolation at positions displaced from the vertex. FIG. 20 shows a flow chart for illustrating the instant embodiment. At a step 101, the information of the detailed model and the visual field information are inputted. In the case of this embodiment, the detailed model information includes that of the simplified model, the transmittance data and the correspondence relation between them. Accordingly, all of these data are inputted at the step 101. According to the instant embodiment of the present invention, the change-over of the detailed model to the simplified model is performed with reference to the distance from the visual point. It should however be noted that there are available several methods for exchanging the detailed model with the simplified model, as described hereinbefore, and any one of these methods, may be adopted in conjunction with the instant embodiment. A step 204 and the following are substantially same as the corresponding ones shown in FIG. 10 except that the repeated processing for the detailed model at the step 204 and the following steps is performed for each of the simplified model data and each of the transmittance data shown in FIGS. 19A and 19B, respectively. At an intersection deciding step 205, those intersection points which are located in the region having transmittance of 100% are regarded not to constitute any intersection point, because the ray of light can pass through such region. Of course, the intersection points located in the region having transmittance of 0% are processed as they are. Through such processing procedure, there can be generated representations by the detailed model as well as by the simplified model on the display, as is shown in FIGS. 21A and 21B. By defining the detailed model by mapping the transmittance data onto the simplified data in this manner, the portion of a body having transmittance of 100% is not displayed in appearance, which in turn means that those lines defining the complicated external shape of a body can be represented only by the distribution of transmittance. Thus, it is possible to represent the complicated external shape of a body with a small amount of the shape data. Further, change-over between the detailed model and the simplified model can be effectuated dependent upon whether the transmittance data is used or not used. Thus, a body of less importance is displayed in the simplified form, whereby the speed-up of the processing can be achieved.

Figure 22:
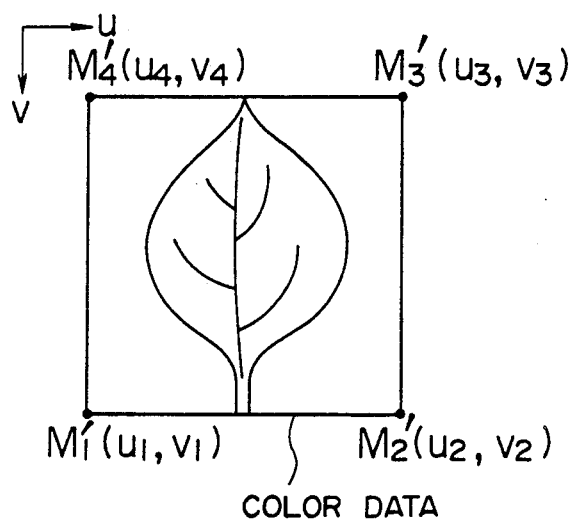
FIG. 22 is a schematic diagram showing color data to be imparted to a simplified model through mapping.
Figure 23A:
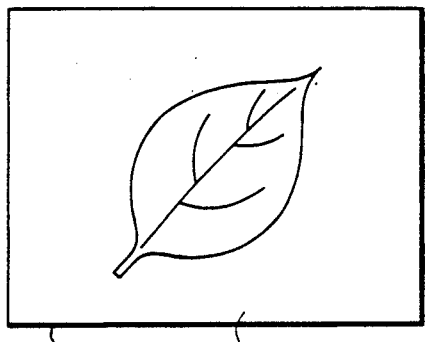
FIGS. 23A and 23B show, respectively, a detailed model generated on a display by imparting the color data shown in FIG. 22 to the data shown in FIG. 19 and a simplified model thereof.
Figure 23B:
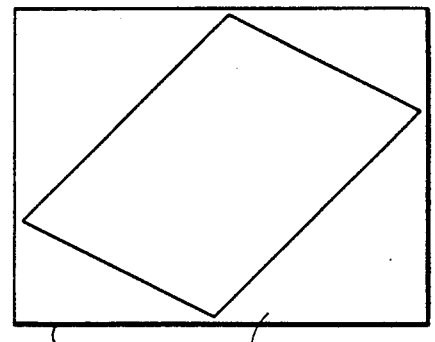

It should further be added that a detailed model can be displayed by mapping color data together with the transmittance data to a simplified data. To this end, color data illustrated in FIG. 22 may be additionally utilized in combination with the simplified model and the transmittance data. The color data is in the form of a two-dimensional table as in the case of the transmittance data and has points $M'_1$ to $M'_4$ defined in correspondence to the aforementioned points on the simplified model. Through the similar processing described hereinbefore in conjunction with FIG. 20, there can be generated a representation by the detailed model or a representation by the simplified model on the display 8, as is illustrated in FIGS. 23A and 23B, respectively. By utilizing additionally the color data in this way, a complicated pattern or shape of a body can be registered as two-dimensional data, whereby display of the detailed model can be obtained with higher accuracy.

Figure 24A:
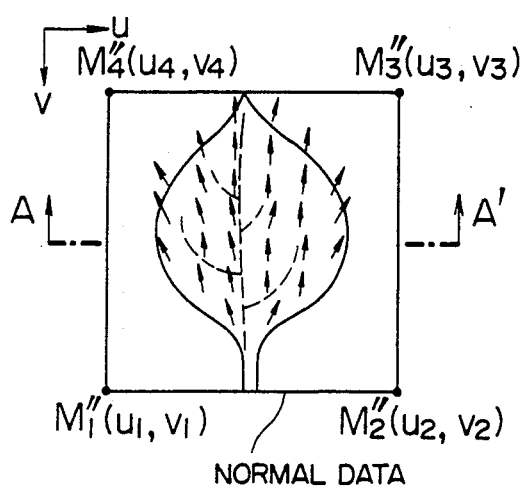
FIGS. 24A to 24C are schematic diagrams for illustrating data of normals to be added to a simplified model.
Figure 24B:
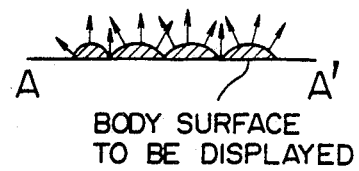
Figure 24C:
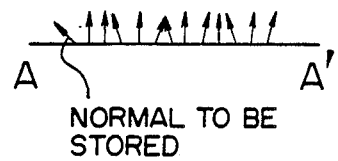
Figure 25:
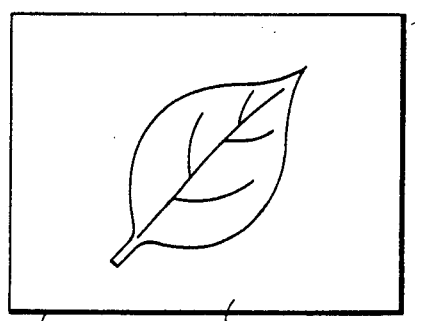
FIG. 25 is a schematic diagram showing the representation by a detailed model as generated on a display by adding the normal data shown in FIG. 24 to the data shown in FIGS. 19 and 22.

According to another embodiment of the present invention, it is possible to generate the representation of a detailed model by applying data of normals to a simplified model in addition to the transmittance data and the color data. FIGS. 24A to 24C are views for illustrating the concept of the normal data, wherein distribution of the normal vectors on a body is stored in the form of a two-dimensional table. As in the case of the transmittance data and the color data, the corresponding points $M'_1$ to $M'_4$ are determined to thereby define the corresponding relation to the simpified model (FIG. 24A). Upon determination of color for the display by calculating the inner product of light source vector and normal vectors, the normal data in the table are utilized as they are rather than calculating the normal data of the body. The normal data stored actually are such as shown in FIG. 24B, while the simplified model is of a planar shape. However, by determining the representation through calculation of the inner product with the light source vector, there can be displayed a representation having such a surface as illustrated in FIG. 24A. FIG. 25 shows an example of representation by the detailed model which is generated by applying the transmittance data, the color data and the normal data to the simplified model. Representation by the simplified model is similar to that shown in FIG. 21. Since the normal data are in the form of two-dimensional table and since various distributions of the normals can be defined, the body having a surface of complicated convex and concave shape can be displayed as the detailed model.

Figure 26:
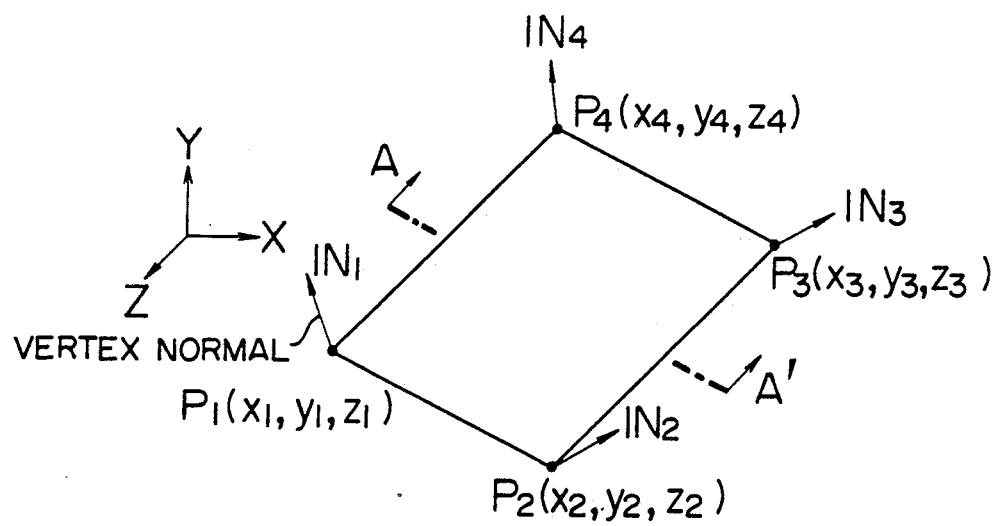
FIG. 26 is a schematic diagram showing vertex normal data to be added to a simplified model.
Figure 27A:
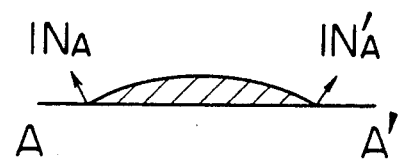
FIGS. 27A to 27C are schematic diagrams illustrating a process of interpolating the vertex normals.
Figure 27B:
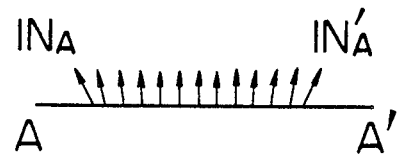
Figure 27C:
Figure 28A:
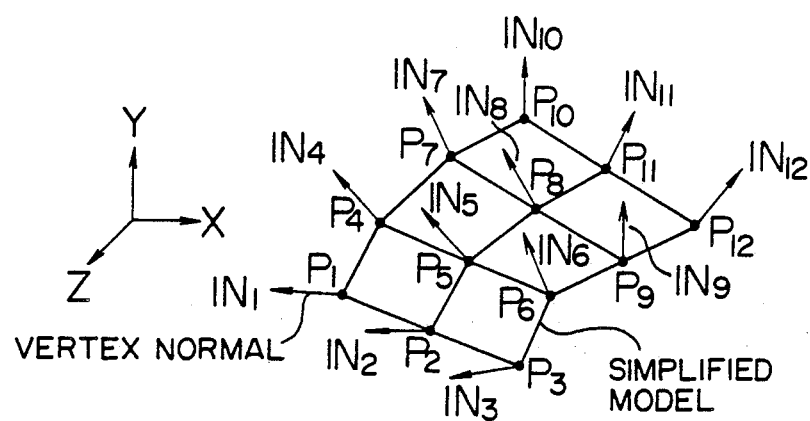
FIGS. 28A to 28D are schematic diagrams for illustrating a simplified model constituted by a plurality of graphic elements.
Figure 28B:
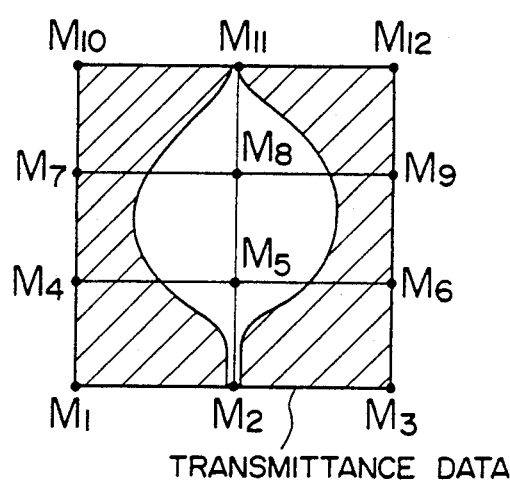
Figure 28C:
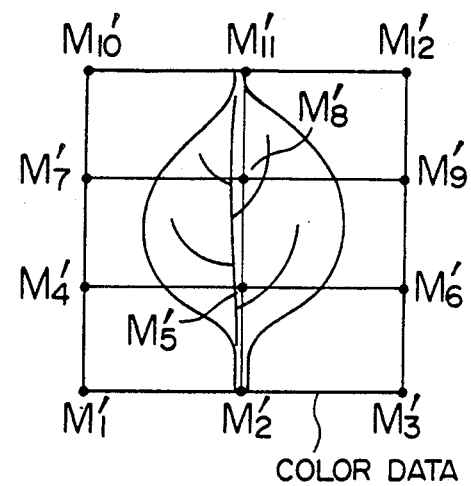
Figure 28D:
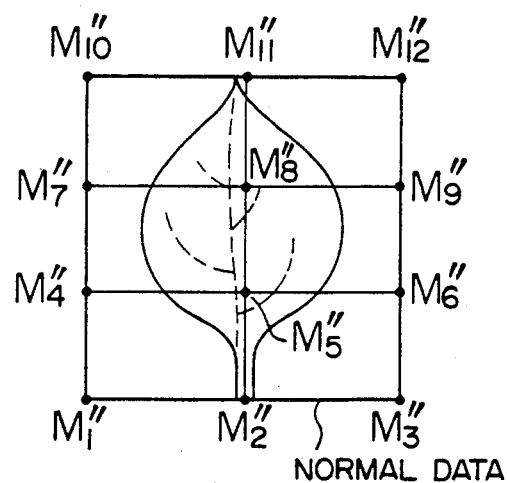

It is also possible to generate a representation by the detailed model by adding the transmittance data, color data, normal data and additionally vertex normal data to the simplified model. FIG. 26 shows an example of the simplified model having four vertexes $P_1$ to $P_4$ imparted with the vertical normal vectors $IN_1$ to $IN_4$ in such general direction as to flare outwardly, so that a flat plane can be displayed as if it was a curved surface, as is illustrated in FIGS. 27A to 27C. The underlying principle will be elucidated below. Referring to FIG. 27A, by interpolating the vectors $IN_1$ and $IN_4$, a vector $IN_A$ is determined. In similar manner, a vector $IN_{A'}$ is arithmetically determined through interpolation for the vectors $IN_2$ and $IN_3$. Subsequently, by interpolating the vectors $IN_A$ and $IN_{A'}$, the normal vectors on the simplified model are determined. All the normal vectors determined in this way are illustrated in FIG. 27B. By utilizing these normal vectors for calculating the inner product with the light source vector, brightness of the representation generated on the display can vary smoothly, whereby the flat plane is displayed as if it was a curved surface. Further, by adding vectorially the normal data obtained through interpolation with the normal data in the two-dimensional table shown in FIG. 24C and displaying the results of the addition, even a body which is a plane in terms of the shape data can be displayed as a detailed model having a curved surface imparted with convexity and concavity, as is shown in FIG. 27C.

As the quantities to be stored as the mapping data, there can be added other optical characteristics such as reflection coefficient and the like, so that the body having a surface whose optical characteristics are varying can also be displayed.

Figure 29A:
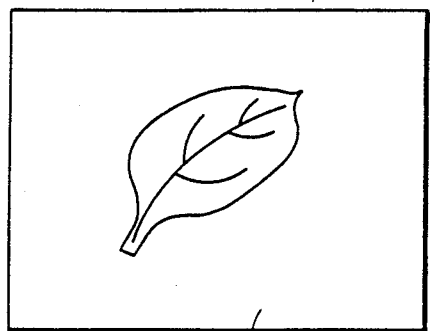
FIGS. 29A and 29B are schematic diagrams showing a detailed model and a simplified model, respectively, generated on a display on the basis of the data shown in FIGS. 28A to 28D.
Figure 29B:
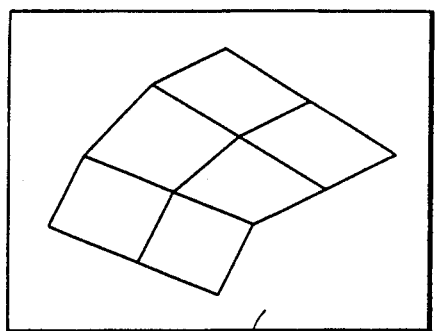

Instead of imparting to a single simplified model the transmittance data, color data and the normal data, it is possible to impart these data to a simplified model having a plurality of figure elements. In the case of the example shown in FIGS. 28A to 28D, the simplified model subject to the processing consists of a set of six plane elements having twelve vertexes $P_1$ to $P_{12}$ in total. For processing this species of simplified model, points corresponding to the vertexes mentioned above, respectively, are determined in the data stored in the form of a two-dimensional table. For example, the corresponding points $M_1$ to $M_{12}$, $M'_1$ to $M'_{12}$ and $M''_1$ to $M''_{12}$ may be designated. By establishing the correspondence relation in this manner, representations of the simplified model and the detailed model can be generated through the procedure described hereinbefore by reference to FIG. 2. FIG. 29A and FIG. 29B show the representation by the detailed model and the representation by the simplified model, respectively, which are generated through the processing procedure described above.

Figure 30:
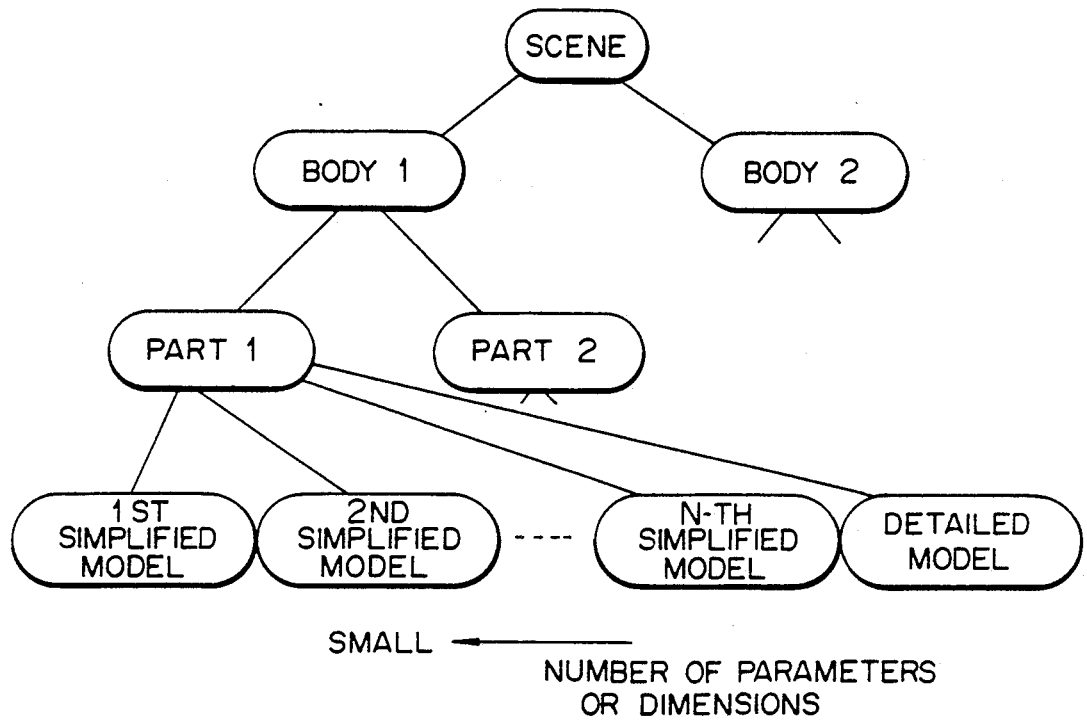
FIG. 30 is a tree diagram showing a data structure in the case where a plurality of simplified models having different degrees of detail are allocated to a single part.
Figure 31:
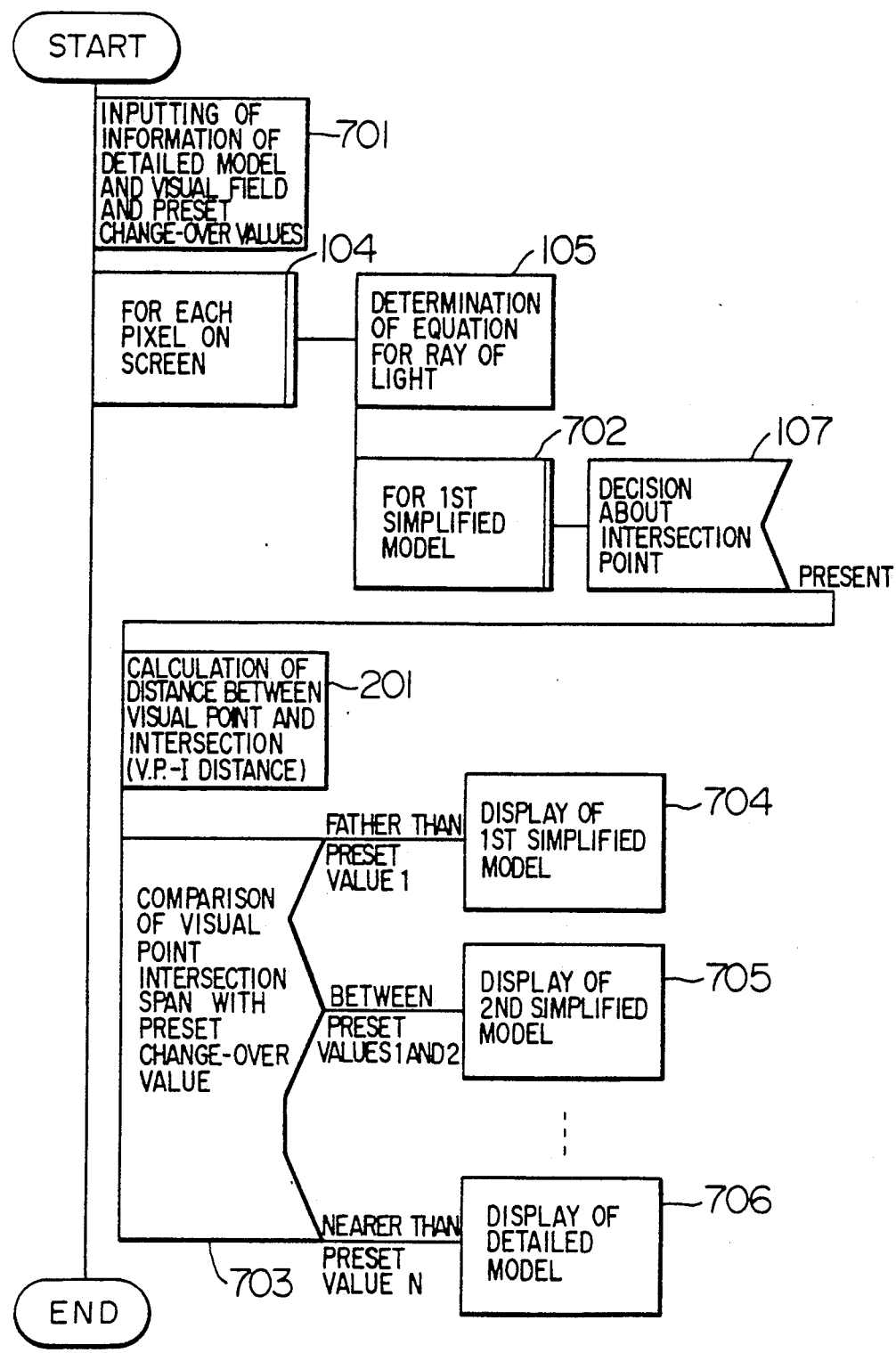
FIG. 31 is a flow chart illustrating a method of displaying the data shown in FIG. 30.

In conjunction with creation of a simplified model from a detailed model to be subsequently displayed, it is possible to allocate to a same body with a plurality of simplified models differing from one another in respect to the degree of detail instead of allocating a single simplified model. FIG. 30 shows an example of such allocation. As will be seen in the figure, a part 1 (PART 1) is allocated with n simplified model and one detailed model. In this case, the simplified models are created from the detailed model by decreasing the number of parameters or the number of dimensions of the latter. At this juncture, the simplified model having the minimum number of parameters or dimensions is referred to as the first simplified model. In the same sense, the other succeeding simplified models are termed the second simplified model, the third simplified model, . . . , the n-th simplified model, respectively. FIG. 31 shows in a flow chart a processing procedure for allocating a number of simplified models to a same body for the display thereof. At a step 701, the information of a detailed model of concern, the visual field information and additionally the preset change-over values are inputted. The preset change-over value is used for designating the simplified model to be displayed. In the case of the instant embodiment in which the change-over of the models to be displayed is effectuated as a function of the distance from the visual point, the change-over values 1 to n represent the distances at n different locations from the visual point. The preset change-over values are termed as the preset value 1, preset value 2, . . . , and the preset value n in the order of the associated locations starting from the one remotest from the visual point. The steps 104 and 105 are equivalent to those denoted by like reference numerals in FIG. 20. A step 702 means that the steps following it are repeated for the first simplified model having the minimum number of parameters or dimensions. The contents of the steps 702 and 107 are same as the steps 106 and 107 shown in FIG. 20. At a step 703, the distance between the visual point and the intersection point determined at the step 201 is compared with the preset change-over values inputted at the step 701. In case a body of concern is located farther from the visual point than the position corresponding to the preset value 1, that body is displayed by the first simplified model at a step 704. For a body positioned between the locations represented by the preset values 1 and 2, respectively, it is checked at a step 705 whether an intersection point with the ray of light is present on the second simplified model. If it is present, the second simplified model is displayed. For a body positioned nearer to the visual point than the location given by the preset value n, it is checked at the step 705 whether an intersection point with the ray of light is present or not. When the intersection point is present, the detailed model is displayed. It is now assumed that n is equal to "2" and that the second simplified model is in the form of a circumscribing rectangular parallelepiped created from the detailed model through the procedure described hereinbefore in conjunction with FIGS. 5 and 6. On the assumption, the first simplified model can be created from the second simplified model mentioned above. More specifically, a circumscribing sphere having radius r is created about the center C, as shown in FIG. 32, to be used as the first simplified model. In that case, the point C represents the center of gravity (centroid) of the circumscribing rectangular parallelepiped, while the radius r represents a half of the length of the diagonal of the circumscribing rectangular parallelepiped. The circumscribing sphere is given by one quadratic equation and reduced in the number of parameters when compared with the circumscribing rectangular parallelepiped which requires six plane defining equations for the representation thereof. By deriving a simplified model having the reduced number of parameters or dimensions from a given simplified model in the manner elucidated above, it is possible to display a body of less importance in the form of a further simplified model, whereby the time involved in the processing for the display can be shortened advantageously.

Figure 33A:
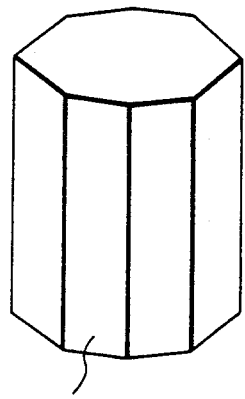
FIGS. 33A to 33C are schematic diagrams for illustrating a method of creating a second simplified model and a first simplified model by controlling the number of divisions of a graphic.
Figure 33B:
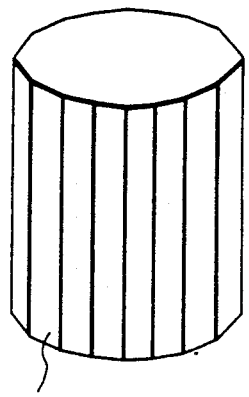
Figure 33C:
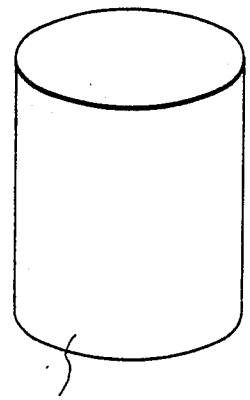

Creation of the first to n-th simplified models from a detailed model can also be realized by varying the number of divisions of a figure or graph of the model. FIGS. 33A to 33C show an example of such a method. Referring to the figures, the detailed model is in the form of a circular cylinder (FIG. 33C). The second simplified model is created in the form of a regular prism having sixteen faces by dividing the circular cylinder with vertical lines in the circumferential direction (FIG. 33B). The first simplified model can then be created in the form of an octagonal prism (FIG. 33A) by decreasing correspondingly the number of divisions of the second simplified model. Manifestly, the first simplified model is decreased in the number of planes when compared with the second simplified model and thus can be represented with a smaller number of parameters. Thus, by allocating the first simplified model to bodies of the less or least importance, the time consumption involved in the processing for display can be significantly reduced. It should be mentioned that the number of divisions can be automatically established as a function of the quantities available for evaluation such as the distance to the body, size thereof and others. Accordingly, the simplified models need not previously be stored as the data, which in turn means that the amount of data required to be stored can be reduced to another advantage.

Figure 34A:
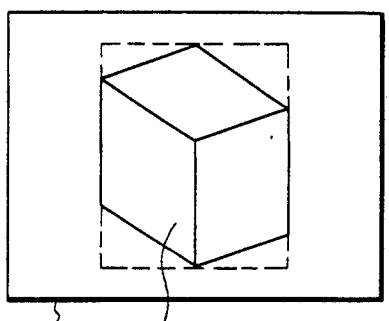
FIGS. 34A and 34B are schematic diagrams illustrating a method of creating a first simplified model from a second simplified model by decreasing the number of dimensions of the latter.
Figure 34B:
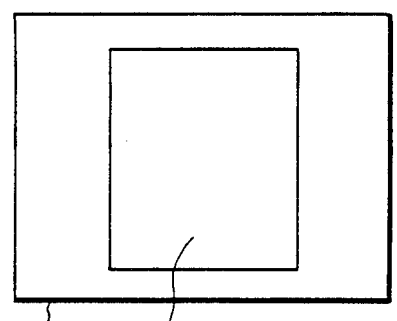

In a method of arithmetically deriving a simplified model further reduced in respect to the degree of detail by decreasing the number of dimensions, a two-dimensional figure can be employed. An example of this method is illustrated in FIGS. 34A and 34B. Referring to these figures, a second simplified model of three dimensions is projected on a screen, whereupon a circumscribing two-dimensional figure is determined to be allocated as the first simplified model. This method can facilitate the processing for display while reducing the time required therefor.

Figure 35A:
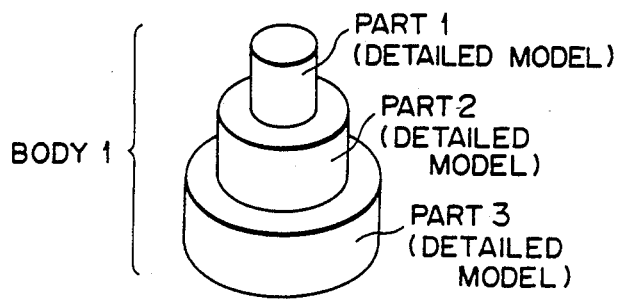
FIGS. 35A to 35D are schematic views for illustrating a method of describing allocation of models having different degrees of detail through designation by an operator
Figure 35B:
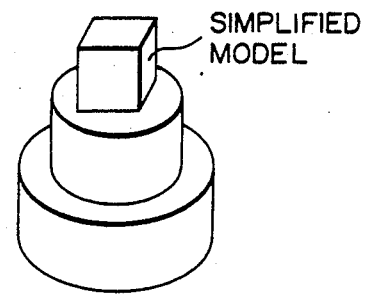

In the embodiments of the present invention described above, the simplified model is automatically created from the detailed model in accordance with a proper algorithm. In the case where the simplified model is to be defined across a number of parts, representation by such model can be generated under the command of an operator. FIGS. 35A to 35D illustrate a method of defining the simplified models under the command of an operator. Referring to FIG. 35A, it is assumed that a body 1 of concern is defined by OR combination (represented by U) of part 1, 2 and 3 (PART 1, PART 2, PART 3). On the other hand, the detailed model is assumed to be in the form of a stack of three circular cylinders, as shown in FIG. 35A. On the assumption, representation of the body 1 wholly by the detailed model is described as follows:

"BODY 1"="PART 1" U "PART 2" U "PART 3"

When only the part 1 of the body 1 is to be represented by a corresponding simplified model, the corresponding representation is described as follows:

"BODY 1"=("PART 1") U "PART 2" U "PART 3"

Figure 35C:
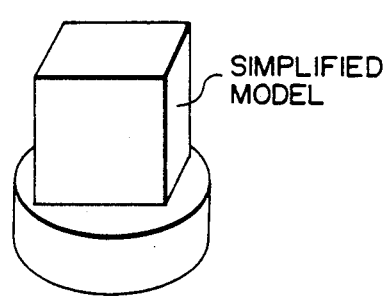

In other words, the part to be represented with the simplified model is designated by bracketing it. Similarly, when the parts 1 and 2 are to be represented by a simplified model, as shown in FIG. 35C, the following description applies valid:

"BODY 1"=("PART 1" U "PART 2") U "PART 3"

Figure 35D:
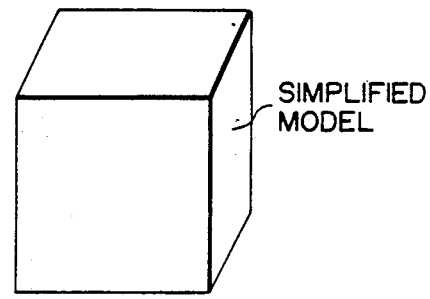

When all the parts are to be represented by a simplified model, as shown in FIG. 35D, the corresponding representation is described as follows:

"BODY 1"=("PART 1" U "PART 2" U "PART 3")

As will be understood from the above description, allocation of the simplified model to the part or parts can be accomplished in accordance with the instruction of operator, whereby finer control can be applied to the allocation of the simplified model when compared with the automatic creation thereof.

As will now be appreciated from the foregoing description, it is possible according to the present invention to discriminatively identify a body of less importance in a scene and decrease the number of parameters or dimensions of a detailed model of that body to thereby create a simplified model for the display in an automatic manner, whereby speeding-up of the processing for display can be accomplished. Determination of an intersection point on a three-dimensional model with the visual line (the ray of light to the visual point) is dealt with as the problem of determining the intersection between a function describing the model and the straight line representative of the visual line. However, intersection between the function of higher degree and the straight line is difficult to determine, involving thus an enormous time consumption in the processing. In contrast, by using the simplified model having the number of dimensions decreased to one or two, the intersection point on the model with the straight line can be determined very easily.

Further, the decision for changing over to the simplified model as well as creation or generation thereof can be realized thoroughly automatically requiring essentially no intervention of the operator. Assuming, for example, that all bodies in a scene are each to be allocated with one detailed model and one simplified model, the operator will have to input the models in a number twice as many as the bodies if the automatic model creation function is unavailable. In contrast, according to the present invention, the operator is required to input only the detailed model(s). Thus, the number of steps for inputting the model data can be significantly decreased to a great advantage.

The present invention provides a high-speed display apparatus for computer graphics in which the burden imposed on an operator for intervention or interaction is remarkably reduced, while assuring high-speed data processing for the display.

We claim:

1. An apparatus for displaying computer graphics, comprising:
    (a) memory storing a first three-dimensional model as a detailed model of a body represented by at least one of a desired number of dimensions, a desired number of parameters and desired parametric quantities;
    (b) arithmetic unit creating a second three-dimensional model as a simplified model of said body by varying at least one of said number of dimensions, said number of parameters and said parametric quantities;
    (c) selector selecting said detailed model or said simplified model with reference to a preset index; and
    (d) display displaying said detailed model or said simplified model in accordance with a selection by said selector;
    wherein a distance between a three-dimensional model on said display and a visual point is compared with said preset index which comprises a preset change-over distance value, said selector selecting between said detailed model and said simplified model in accordance with the comparison, and wherein said display displays and detailed model when said distance is smaller than said preset change-over distance value and displays said simplified model when said distance is greater than said preset change-over distance value.

2. An apparatus for displaying computer graphics according to claim 1, wherein said arithmetic unit creates said simplified model by varying at least one of said number of dimensions, said number of parameters and said parametric quantities in accordance with a predetermined operation.

3. An apparatus for displaying computer graphics according to claim 1, wherein said detailed model is constituted by shape data describing a basic shape of said body to be displayed and mapping data describing attributes of said body in addition to said basic shape.

4. An apparatus for displaying computer graphics according to claim 3, wherein said mapping data include data related to a light transmittance characteristic of said body.

5. An apparatus for displaying computer graphics according to claim 3, wherein said mapping data include normal data representative of a distribution of directions of normals along a surface of said body, and further including:
    color definer determining a color representation for display of said body in accordance with said normal data.

6. An apparatus for displaying computer graphics according to claim 5, wherein said mapping data further include vertex normal data indicating directions of normals at vertices of graphic display elements, and wherein
    said color definer uses said vertex normal data in addition to said normal data to determine said color representation.

7. An apparatus for displaying computer graphics, comprising:
    (a) first memory storing a first three-dimensional model as a detailed model of a body represented by at least one of a desired first number of dimensions, a desired first number of parameters and desired first parametric quantities;

(b) arithmetic unit creating a second three-dimensional model as a simplified model of said body by varying at least one of said first number of dimensions, said first number of parameters and said first parametric quantities to at least one of a second number of dimensions, a second number of parameters and second parametric quantities;

(c) second memory storing said second three-dimensional model;

(d) selector selecting said detailed model or said simplified model by reference to a present index; and (e) display displaying said detailed model or said simplified model as selected by said selector;

wherein a distance between a three-dimensional model on said display and a visual point is compared with a preset change-over distance value, said selector selecting between said detailed model and said simplified model in accordance with the comparison and wherein said display displays said detailed model when said distance is smaller than said preset change-over distance value.

8. An apparatus for displaying computer graphics according to claim 7, wherein said arithmetic unit creates said simplified model from said detailed model by decreasing at least one of said first number of dimensions, said first number of parameters and said first parametric quantities to at least one of a second number of dimensions, a second number of parameters and second parametric quantities.

9. An apparatus for displaying computer graphics according to claim 7, wherein said detailed model is constituted by shape data describing a basic shape of said body to be displayed and by mapping data describing the attributes of said body in addition to said basic shape.

10. An apparatus for displaying computer graphics according to claim 9, wherein said mapping data include data related to a light transmittance characteristic of said body.

11. An apparatus for displaying computer graphics according to claim 9, wherein said mapping data include normal data indicating a distribution of directions of normals along a surface of said body, and further including:

color definer determining a color representation for display of said body in accordance with said normal data.

12. An apparatus for displaying computer graphics according to claim 11, wherein said mapping data further include vertex normal data indicating directions of normals at vertices of graphic display elements, and wherein said color definer determines said color representation for display of said body using said vertex normal data in addition to said normal data.

13. An apparatus for displaying computer graphics, comprising:

(a) first memory storing a first three-dimensional model as a detailed model of a body, represented by at least one of a desired first number of dimensions, a desired first number of parameters and desired first parametric quantities;

(b) second memory storing a second three-dimensional model as a simplified model of said body represented by at least one of a second number of dimensions, a second number of parameters and second parametric quantities which differs from at least one of said first number of dimensions, said first number of parameters and said first parametric quantities;

(c) arithmetic unit creating a third three-dimensional model of said body represented by at least one of a third number of dimensions, a third number of parameters and third parametric quantities in accordance with a correlation existing between said detailed model and said simplified model;

(d) selector selecting one of said detailed model, said simplified model and said third three-dimensional model by reference to a preset index; and (e) display displaying said detailed model, said simplified model or said third three-dimensional model as selected by said selector;

wherein a distance between a three-dimensional model on said display and a visual point is compared with said preset index which comprises a preset change-over distance value, said selector selecting between said detailed model and said simplified model in accordance with the comparison, and wherein said display displays said detailed model when said distance is smaller than said preset change-over distance value and displays said simplified model when said distance is greater than said preset change-over distance value.

14. An apparatus for displaying computer graphics according to claim 13, wherein said third three-dimensional model is represented by at least one of a third number of dimensions, a third number of parameters and third parametric quantities which lies between at least one of said first number of dimensions, said first number of parameters and said first parametric quantities and at least one of said second number of dimensions, said second number of parameters and said second parametric quantities.

15. An apparatus for displaying computer graphics according to claim 13, wherein said third three-dimensional model being represented by at least one of a third number of dimensions, a third number of parameters and third parametric quantities which is smaller than at least one of said first number of dimensions, said first number of parameters and said first parametric quantities and at least one of said second number of dimensions, and second number of parameters and said second parametric quantities.

16. An apparatus for displaying computer graphics according to claim 13, wherein said detailed model is constituted by shape data describing a basic shape of said body to be displayed and by mapping data describing attributes of said body other than said basic shape.

17. An apparatus for displaying computer graphics according to claim 16, wherein said mapping data include data related to a light transmittance characteristic of said body.

18. An apparatus for displaying computer graphics according to claim 16, wherein said mapping data include normal data indicating a distribution of directions of normals along a surface of said body, and further including:

color definer determining a color representation for display of said body in accordance with said normal data.

19. An apparatus for displaying computer graphics according to claim 18, wherein said mapping data further include vertex normal data indicating directions of normals at vertices of figure elements, and wherein said color definer uses said vertex normal data in addition to said normal data to determine said color representation.

20. An apparatus for displaying computer graphics, comprising:
  (a) first memory storing a first three-dimensional model as a detailed model of a body represented by at least one of a desired first number of dimensions, a desired first number of parameters and desired first parametric quantities;
  (b) first arithmetic unit creating a second three-dimensional model as a simplified model of said body by varying at least one of said first number of dimensions, said first number of parameters and said first parametric quantities to at least one of a second number of dimensions, a second number of parameters and second parametric quantities;
  (c) second memory storing said simplified model;
  (d) second arithmetic unit creating a third three-dimensional model of said body represented by at least one of a third number of dimensions, a third number of parameters and third parametric quantities in accordance with a correlation existing between said detailed model and said simplified model;
  (e) selector selecting one of said detailed model, said simplified model and said third three dimensional model by reference to a preset index; and
  (f) display displaying said detailed model, said simplified model or said third three-dimensional model in accordance with a selection by said selector;
wherein a distance between a three-dimensional model on said display and a visual point is compared with said preset index which comprises a preset change-over distance value, said selector selecting between said detailed model and said simplified model in accordance with the comparison, and wherein said display displays said detailed model when said distance is smaller than said preset change-over distance value and displays said simplified model when said distance is greater than said preset change-over distance value.

21. An apparatus for displaying computer graphics according to claim 20, wherein said first arithmetic unit creates said simplified model by decreasing at least one of said first number of dimensions, said first number of parameters and said first parametric quantities to at least one of a second number of dimensions, a second number of parameters and second parametric quantities.

22. An apparatus for displaying computer graphics according to claim 20, wherein,
  said third three-dimensional model is represented by at least one of a third number of dimensions, a third number of parameters and third parametric quantities which lies between at least one of said first number of dimensions, said first number of parameters and said first parametric quantities and at least one of said second number of dimensions, said second number of parameters and said second parametric quantities.

23. An apparatus for displaying computer graphics according to claim 20, wherein,
  said third three-dimensional model being represented by at least one of a third number of dimensions, a third number of parameters and third parametric quantities which is smaller than at least one of said first number of dimensions, said first number of parameters and said first parametric quantities and at least one of said second number of dimensions, said second number of parameters and said second parametric quantities.

24. An apparatus for displaying computer graphics according to claim 20, wherein said detailed model is constituted by shape data describing a basic shape of said body to be displayed and by mapping data describing attributes of said body in addition to said basic shape.

25. An apparatus for displaying computer graphics according to claim 24, wherein said mapping data include data related to a light transmittance characteristic of said body.

26. An apparatus for displaying computer graphics according to claim 24, wherein said mapping data include normal data representative of a distribution of directions of normals along a surface of said body, and further including:
  color definer determining a color representation for display of said body in accordance with said normal data.

27. An apparatus for displaying computer graphics according to claim 26, wherein said mapping data further include vertex normal data indicating directions of normals at vertices of graphic display elements, and wherein said color definer uses said vertex normal data in addition to said normal data to determine said color representation.

28. An apparatus for displaying computer graphics, comprising:
  (a) first memory storing a first three-dimensional model as a detailed model of a body represented by at least one of a desired first number of dimensions, a desired first number of parameters and desired first parametric quantities;
  (b) second memory storing a second three-dimensional model as simplified model of said body represented by at least one of a second number of dimensions, a second number of parameters and second parametric quantities which differs from at least one of said first number of dimensions, said first number of parameters and said first parametric quantities;
  (c) selector selecting one of said detailed model or said simplified model, by reference to a speed of movement of said body when displayed serving as a selection criterion; and
  (d) display displaying said detailed model or said simplified model in accordance with a selection by said selector;
wherein a distance between a three-dimensional model on said display and a visual point is compared with said preset index which comprises a preset change-over distance value, said selector selecting between said detailed model and said simplified model in accordance with the comparison, and wherein said display displays said detailed model when said distance is smaller than said preset change-over distance value and displays said simplified model when said distance is greater than said preset change-over distance value.

29. An apparatus for displaying computer graphics according to claim 28, wherein at least one of said second number of dimensions, said second number of parameters and said second parametric quantities is smaller than at least one of said first number of dimensions, said first number of parameters and said first parametric quantities.

30. An apparatus for displaying computer graphics according to claim 28, wherein said detailed model is constituted by shape data describing a basic shape of said body to be displayed and by mapping data describing attributes of said body in addition to said basic shape.

31. An apparatus for displaying computer graphics according to claim 30, wherein said mapping data include data related to a light transmittance characteristic of said body.

32. An apparatus for displaying computer graphics according to claim 30, wherein said mapping data include normal data representing a distribution of directions of normals along a surface of said body, and further including:

color definer determining color representation for display of said body in accordance with said normal data.

33. An apparatus displaying computer graphics according to claim 32, wherein said mapping data further include vertex normal data indicating directions of normals at vertices of graphic display elements, and wherein said color definer uses said vertex normal data together with said normal data to determine said color representation.

* * * * *

UNITED STATES PATENT AND TRADEMARK OFFICE
CERTIFICATE OF CORRECTION

PATENT NO.   :   4,994,989
DATED        :   February 19, 1991
INVENTOR(S)  :   Yoshiaki Usami et al.

It is certified that error appears in the above-identified patent and that said Letters Patent is hereby corrected as shown below:

| Column | Line | |
|--------|------|---|
| 6 | 10 | Change "26" to --26--. |
| 6 | 50 | After "by" change " $_v$" to -- $\mathbb{P}_v$--. |
| 6 | 51 | After "and" change " $_s$" to -- $\mathrm{P}_s$--. |
| 6 | 53 | Change "( $_s$ - $_v$," to --( $\mathbb{P}_s$ - $\mathbb{P}_v$)--. |
| 7 | 22 | After "through" insert --.--. |
| 7 | 40 | After "FIG. 9" insert --.--. |
| 8 | 2 | Delete "the teaching of". |
| 8 | 38 | After "operator" insert --.--. |
| 9 | 6 | After "calculated" insert --.--. |
| 18 | 30 | Change "and" to --said--. |

Signed and Sealed this

Third Day of November, 1992

*Attest:*

DOUGLAS B. COMER

*Attesting Officer*   *Acting Commissioner of Patents and Trademarks*